US008090975B2

(12) United States Patent
Naohiro et al.

(10) Patent No.: US 8,090,975 B2
(45) Date of Patent: Jan. 3, 2012

(54) RECOVERY SERVER FOR RECOVERING MANAGED SERVER

(75) Inventors: Tamura Naohiro, Kawasaki (JP); Iwatani Sawao, Kawasaki (JP); Miyamoto Kaoru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 278 days.

(21) Appl. No.: 12/463,085

(22) Filed: May 8, 2009

(65) Prior Publication Data

US 2009/0282284 A1  Nov. 12, 2009

(30) Foreign Application Priority Data

May 9, 2008  (JP) ................................. 2008-123375
Apr. 27, 2009  (JP) ................................. 2009-107258

(51) Int. Cl.
*G06F 11/00* (2006.01)
(52) U.S. Cl. ........................................................ 714/4.1
(58) Field of Classification Search ......... 713/2; 714/13
See application file for complete search history.

(56) References Cited

U.S. PATENT DOCUMENTS

| | | | | |
|---|---|---|---|---|
| 6,931,558 B1* | 8/2005 | Jeffe et al. ..................... 713/340 |
| 7,444,502 B2* | 10/2008 | Hatasaki et al. .................. 713/1 |
| 7,526,639 B2* | 4/2009 | Duron et al. ....................... 713/1 |
| 7,627,781 B2* | 12/2009 | Michaelis et al. ............... 714/13 |
| 7,657,786 B2* | 2/2010 | Takuwa et al. ................... 714/13 |
| 7,711,983 B2* | 5/2010 | Hatasaki et al. ................. 714/13 |
| 7,783,877 B2* | 8/2010 | Lu ..................................... 713/2 |
| 7,840,835 B2* | 11/2010 | Hatasaki et al. ................ 714/4.1 |
| 7,856,488 B2* | 12/2010 | Cripe et al. ..................... 709/220 |
| 2005/0149924 A1* | 7/2005 | Komarla et al. ............... 717/176 |
| 2007/0192466 A1* | 8/2007 | Nahum .......................... 709/223 |
| 2007/0214387 A1* | 9/2007 | Nakajima et al. ................ 714/13 |
| 2007/0234116 A1* | 10/2007 | Yoshikawa et al. .............. 714/13 |
| 2008/0028201 A1* | 1/2008 | Chu et al. ........................... 713/2 |
| 2008/0201605 A1* | 8/2008 | Duan et al. ........................ 714/13 |
| 2008/0263390 A1* | 10/2008 | Baba et al. .......................... 714/4 |
| 2008/0294888 A1* | 11/2008 | Ando et al. ........................ 713/2 |
| 2008/0307216 A1* | 12/2008 | Ueno et al. ........................ 713/2 |
| 2009/0132797 A1* | 5/2009 | Lo .................................... 713/2 |
| 2009/0282283 A1* | 11/2009 | Sakakura et al. ................. 714/4 |
| 2010/0037041 A1* | 2/2010 | Joshi et al. ........................ 713/2 |
| 2010/0100760 A1* | 4/2010 | Goto et al. ........................ 714/3 |
| 2010/0138642 A1* | 6/2010 | Cherian et al. ................... 713/2 |
| 2010/0138686 A1* | 6/2010 | Arata et al. ....................... 714/4 |

FOREIGN PATENT DOCUMENTS

JP     2007-293422     11/2007

* cited by examiner

*Primary Examiner* — Robert Beausoliel, Jr.
*Assistant Examiner* — Neil Miles
(74) *Attorney, Agent, or Firm* — Staas & Halsey LLP

(57) ABSTRACT

When the boot monitoring unit receives, from a management server, a first boot response for a first boot request from a NIC1 of a managed server, a boot monitoring unit stores a receiving time of the first boot response. When the boot monitoring unit receives a second boot request from a NIC2 of the managed server, and when a predetermined time has not elapsed from the receiving time, the boot monitoring unit determines that the management server is normal, and transmits an NOP program to the managed server. When the predetermined time has elapsed from the receiving time, the boot monitoring unit determines that the management server is stopped, and transmits a recovering program to the managed server.

10 Claims, 17 Drawing Sheets

FIG. 4

| SAVER NAME | MAC1 | MAC2 | IP | WWNN | WWPN | CONDITION | POWER | BMC | SPARE SERVER |
|---|---|---|---|---|---|---|---|---|---|
| srv-1 | mac1-1 | mac2-1 | ip-1 | wwn-1, wwn-11 | wwn-11, wwn-12 | ok | on | ip-b1 | srv-10 |
| srv-2 | mac1-2 | mac2-2 | ip-2 | wwn-2 | wwn-21 | ok | on | ip-b2 | srv-10 |
| ... | ... | ... | ... | ... | ... | ... | ... | ... | ... |
| srv-10 | mac1-10 | mac2-10 | — | — | — | ok | off | ip-b10 | — |

~14

FIG. 5A
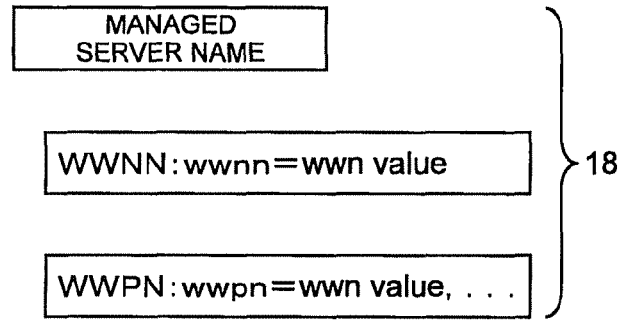
FIG. 5B
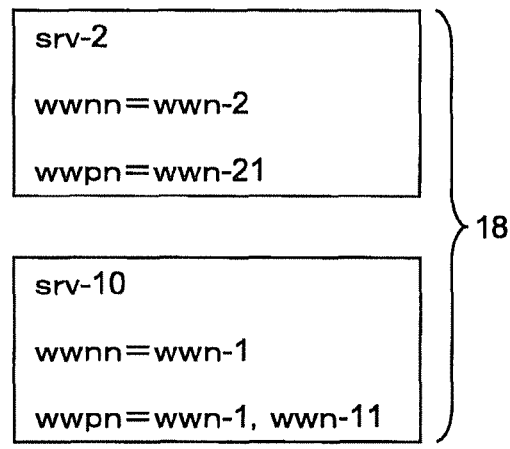
FIG. 6
| SERVER NAME | MAC1 | MAC2 | IP | MAC1 BOOT TIME |
|---|---|---|---|---|
| srv-1 | mac1-1 | mac2-1 | ip-1 | 12345678 |
| srv-2 | mac1-2 | mac2-2 | ip-2 | |
| ⋮ | ⋮ | ⋮ | ⋮ | ⋮ |
| srv-10 | mac1-10 | mac2-10 | — | |

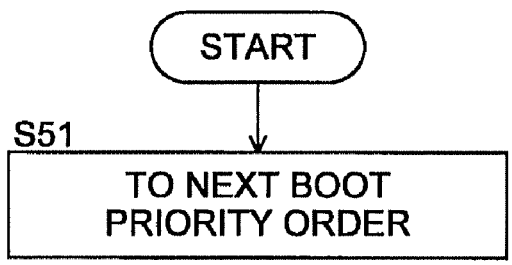
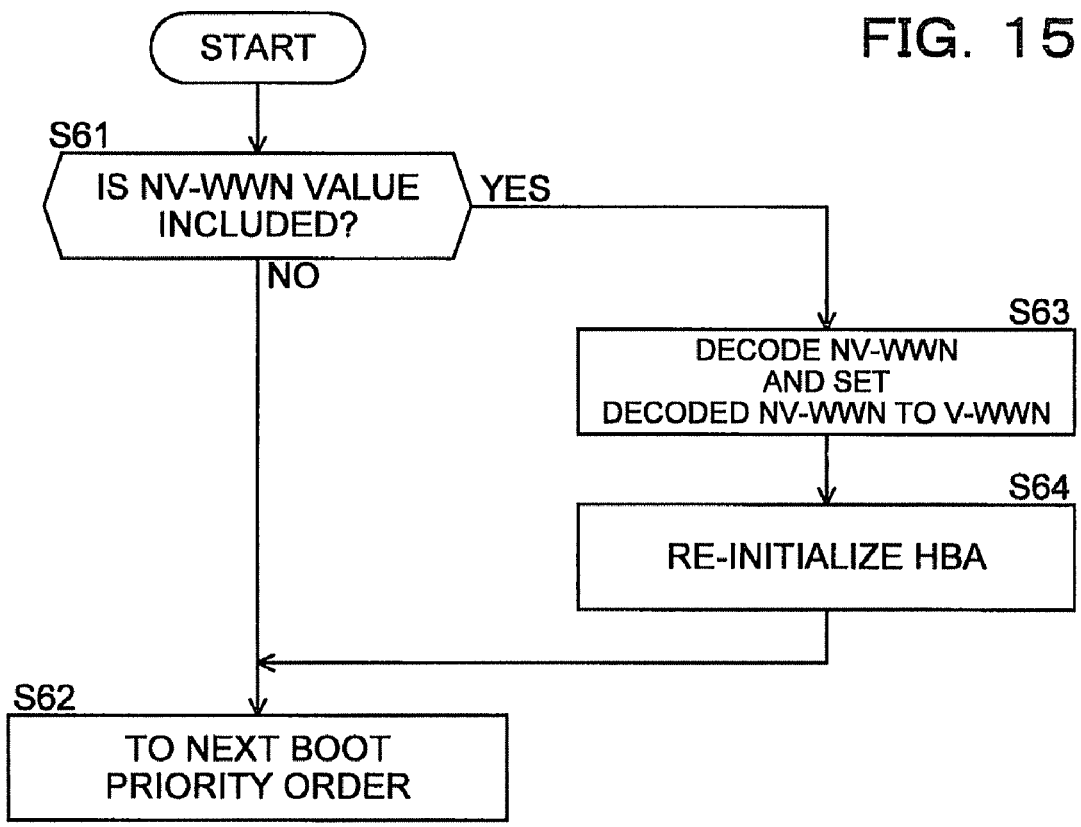

RECOVERY SERVER FOR RECOVERING MANAGED SERVER

CROSS-REFERENCE TO RELATED APPLICATIONS

This application is based upon and claims the benefit of priority of the prior Japanese Patent Application No. 2008-123375, filed on May 9, 2008, and Japanese Patent Application No. 2009-107258, filed on Apr. 27, 2009, the entire contents of both of which are incorporated herein by references.

Field

The embodiments discussed herein are related to a recovery server, a computer readable storage medium storing a recovery processing program, and a computer system.

BACKGROUND

A computer system that boots up from a SAN (storage area network), (the computer system in a SAN environment) has been known. In the computer system in the SAN environment, each server reads a program such as an OS (Operating System) from an external disk apparatus, which is a storage, through the SAN. Thereby, each server is booted up.

In the computer system in the SAN environment, to improve the reliability of the computer system, when a fault occurs in one server (active computer) for example, another server (stand-by computer) continues to execute a job of the server with the fault. That is, the server has redundancy.

In the redundant computer system in the SAN environment, for the same purpose, even when the fault occurs in a network switch and the external disk apparatus constituting the SAN, the stand-by computer is adapted to be able to continue the job of the active computer (refer to Japanese Laid-Open Patent Publication No. 2007-293422).

The reliability of the computer system in the SAN environment is improved by means of a variety of configurations. However, as described above, while various considerations have been made for the fault in the server (managed server), the network switch, and the external disk apparatus, the consideration is not made for the fault in a management server (boot server).

That is, even in the redundant computer system in the SAN environment, a hardware fault or a software fault may occur in the management server. According to the study by the present inventor, since the managed server in this case can not obtain a WWN (World Wide Name) value, or a unique ID, from the management server, the managed server can not set a WWN value in an HBA (Host Bus Adapter) of the managed server. Thus, the managed server cannot boot the program such as the OS (Operating System) from the storage through the SAN.

SUMMARY

According to one aspect of the invention, a recovery server is connected to a management server and a plurality of managed servers through a management network. The recovery server includes a recovery management table storing an address of a first communicating unit transmitting a first boot request, and an address of a second communicating unit transmitting a second boot request in the managed server in which priority order is set in order of a first boot, a second boot, and a SAN boot, a monitoring unit monitoring a first boot response which is a response for the first boot request from the management server, and a storing unit storing an NOP (No Operation) program not executing a recovering process, and a recovering program executing the recovering process. When the monitoring unit receives the first boot response from the management server, the monitoring unit stores a receiving time in the recovery management table. When the monitoring unit receives the second boot response from the managed server and when a predetermined time has not elapsed from the receiving time stored in the recovery management table, the monitoring unit determines that the management server is normal, and transmits the NOP program to the managed server, and when the predetermined time has elapsed, the monitoring unit determines that the management server is stopped, and transmits the recovering program to the managed server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a server management table;

FIG. 5A and FIG. 5B illustrate an example of a server definition table;

FIG. 6 illustrates an example of a recovery management file;

FIG. 14 and FIG. 15 illustrate processing flows for the booting process executed by the managed server;

DESCRIPTION OF EMBODIMENTS

Preferred embodiments of the present invention will be explained with reference to accompanying drawings.

First Embodiment

Figure 1:
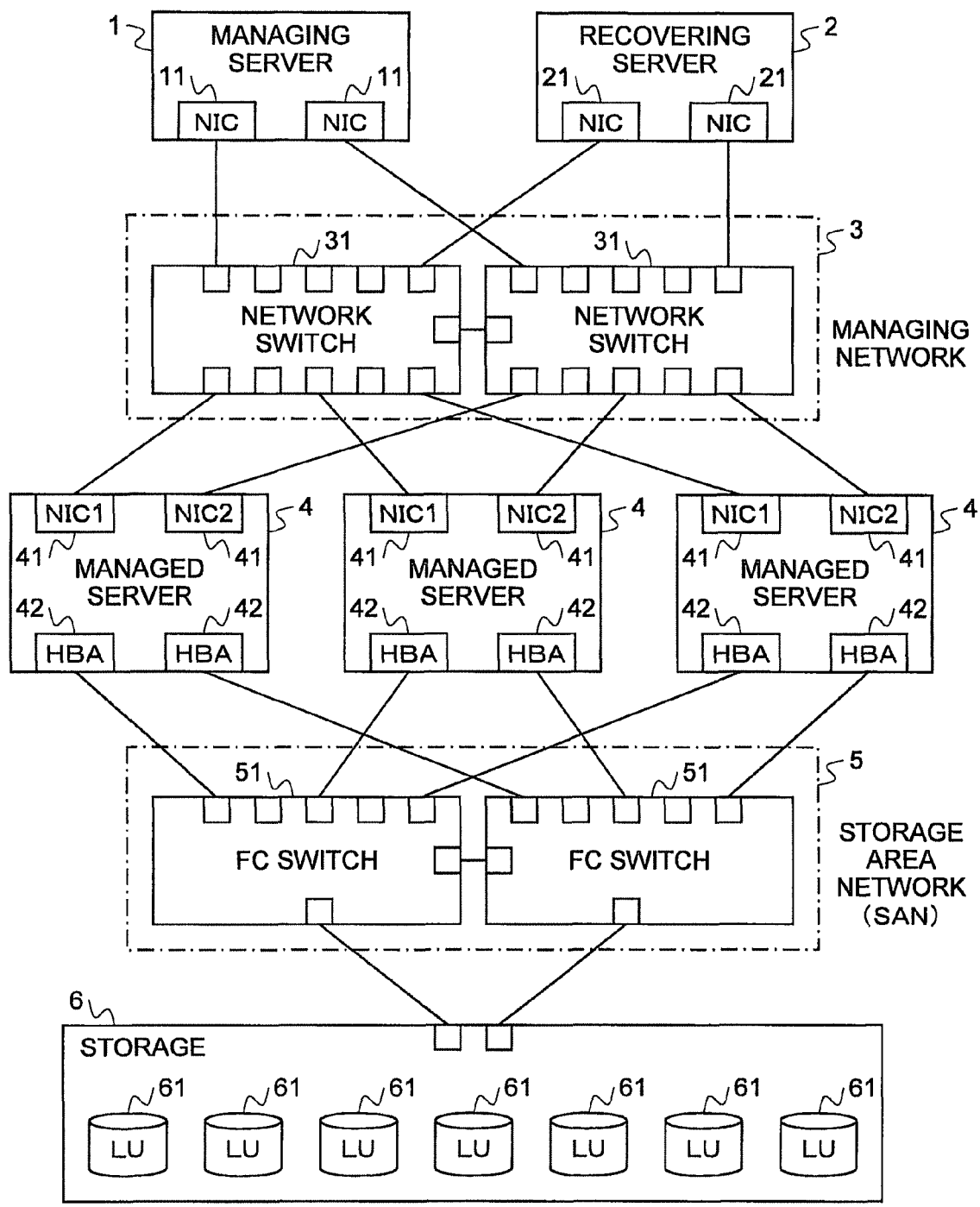
FIG. 1 illustrates an example of a configuration of a redundant computer system in a SAN environment.

FIG. 1 is a diagram illustrating an example of a configuration of the redundant computer system in the SAN environment of an embodiment of the present invention.

This computer system includes a management server 1, a recovery server 2, a management network 3, a plurality of managed servers 4, a storage area network (SAN) 5, and a storage (storage apparatus) 6. The management server 1 and the recovery server 2 are connected to the plurality of the managed servers 4 through the management network 3. The plurality of the managed servers 4 is connected to the storage 6 through the SAN 5.

The management network 3 is replicated by two network switches 31. Thus, the management server 1 includes two NICs (Network Interface Cards) 11, the recovery server 2 includes two NICs 21, and each of the plurality of the managed servers 4 includes two NICs 41. Thereby, as illustrated in FIG. 1, the management server 1, the recovery server 2, and the plurality of the managed servers 4 are replicated to be connected to each other.

The SAN 5 is replicated by two FC (Fibre Channel) switches 51. Thus, each of the plurality of the managed servers 4 is provided with two HBAs (Host Bus Adapters) 42. Thereby, as illustrated in FIG. 1, a plurality of the managed servers 4 and the storage 6 are replicated to be connected to each other. The managed servers 4 boot a program (referred to as software image) such as the OS from the storage 6, and access data of the storage 6 through the SAN 5.

The storage 6 includes a plurality of logical units (LU) 61. A WWPN (World Wide Port Name) value, a unique ID, is previously assigned in a port of the FC switch 51 used by the managed server 4. The SAN 5 relates the LU 61 storing the OS of the managed server 4, to a WWNN (World Wide Node Name) value of the HBA 42 of the managed server 4 and the WWPN value of the port of the FC switch 51 used by the managed server 4. Thereby, the SAN 5 accesses, in the booting process, the LU 61 only from the HBA 42 of the WWNN value and the port of the WWPN value.

Figure 2:
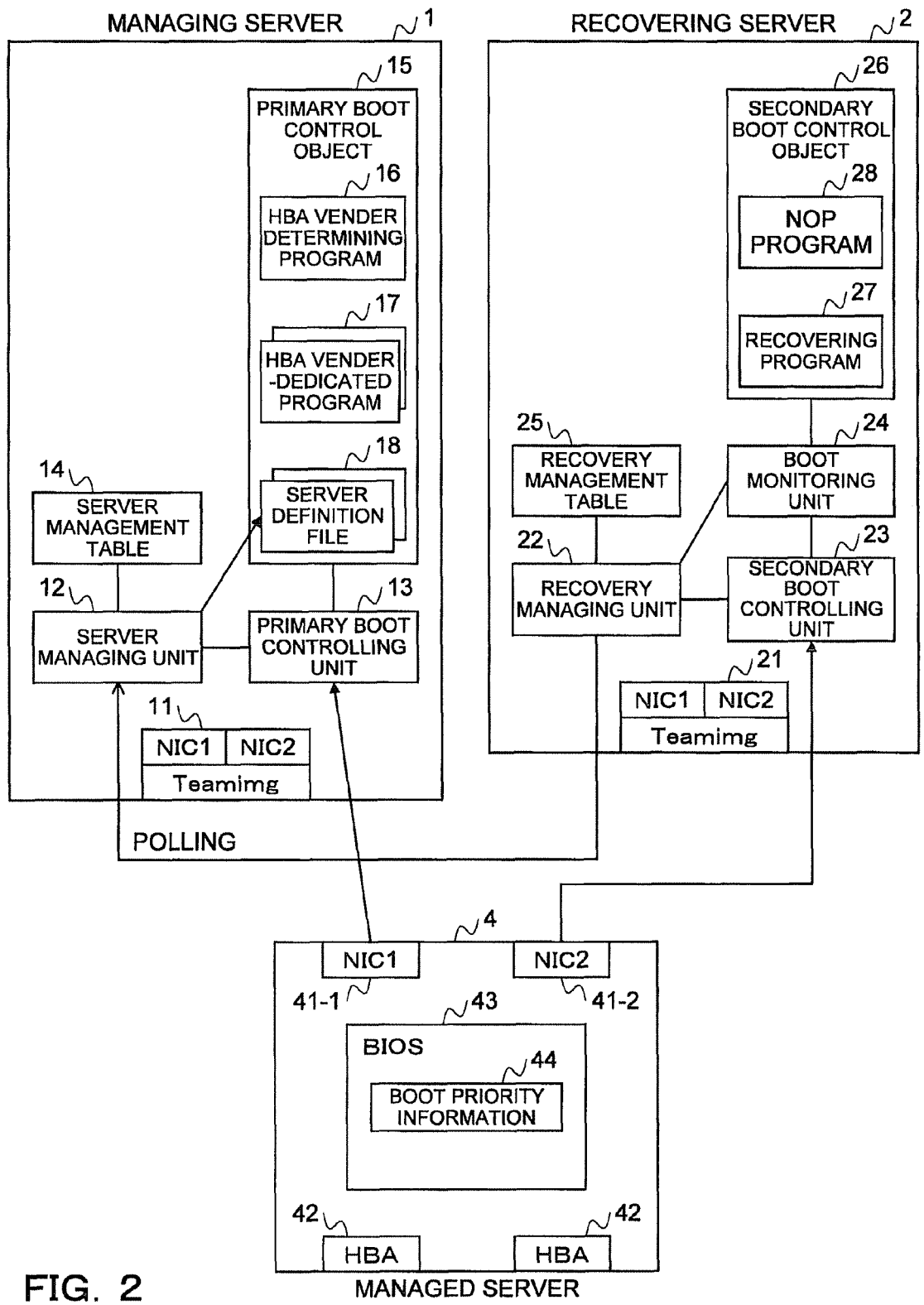
FIG. 2 illustrates an example of a configuration of a management server and a managed server in the redundant computer system in the SAN environment.

FIG. 2 is a diagram illustrating an example of a configuration of the management server 1 and the managed server 4 in the redundant computer system in the SAN environment of the embodiment.

As illustrated in FIG. 2, the managed server 4 of the embodiment includes the two NICs 41, the two HBAs 42, and a BIOS (Basic Input-Output System) 43.

The NIC 41 is a communicating unit or an interface executing a communicating process with the management server 1 or the recovery server 2 through the management network 3 in each managed server 4. The NIC 41 includes a NIC 41-1 which is a first communicating unit or interface, and a NIC 41-2 which is a second communicating unit or interface. In the managed server 4, the NIC 41-1 and the NIC 41-2 are mutually distinguished. That is, when the managed server 4 is started, a teaming function, which is a function of the OS, cannot be used, so that each of the NIC 41-1 and the NIC 41-2 individually operates. The NIC 41-1 corresponds to the management server 1, and the NIC 41-2 corresponds to the recovery server 2.

The HBA 42 is a communicating unit or an interface executing a communicating process with the storage 6 through the SAN 5 in each managed server 4.

The BIOS 43 is a controlling program that is a part of the OS of the managed server 4, and is a boot requesting unit for issuing a boot request from the NIC 41-1 or the NIC 41-2. The BIOS 43 includes boot priority order information 44. The boot priority order information 44 is provided in advance, and is constant.

Figure 3A:
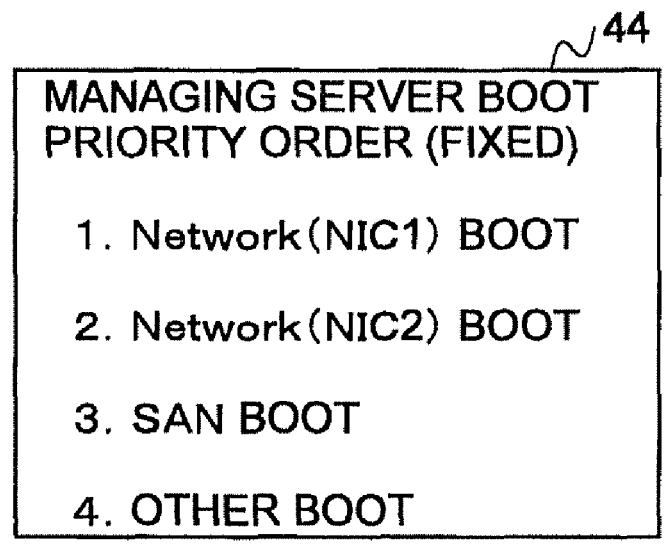
FIG. 3A and FIG. 3B illustrate boot priority order information and a WWN value.

FIG. 3A illustrates an example of the boot priority order information 44 provided in the BIOS 43. The boot priority order information 44 is information for determining the priority order for executing the booting process in the managed server 4, and is, for example, held in a predetermined memory managed by the BIOS 43 of the managed server 4. The BIOS 43 is a boot priority order setting unit. The priority order of the booting process is fixed to the priority order illustrated in FIG. 3A by the boot priority order information 44. That is, first priority is "NIC 1 boot", and is followed by "NIC 2 boot", "SAN boot", and "other".

The "NIC 1 boot" is a network boot from the NIC 41-1. That is, the "NIC 1 boot" is a first network boot in the replicated management network 3. The "NIC 2 boot" is a second network boot from the NIC 41-2. That is, the "NIC 2 boot" is the second network boot in the replicated management network 3. The "SAN boot" is the boot in the SAN 5. The "other" is the boot (for example, a local boot) other than the above three boots.

In the managed server 4, by the boot priority order information 44, the boot priority order is, at least, fixed in order of the boot from the NIC 41-1 corresponding to the management server 1, the boot from the NIC 41-2 corresponding to the recovery server 2, and the boot from the SAN 5. The boot of the "other" may be omitted.

Figure 3B:
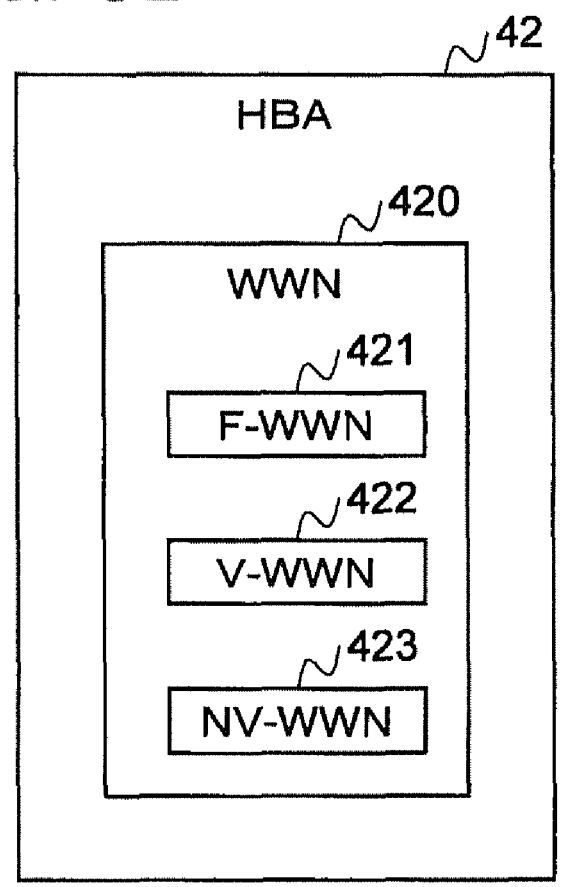

FIG. 3B illustrates the WWN value provided in the HBA 42. The HBA 42 is provided with a storing area 420 storing the WWN value. The storing area 420 is provided with an F-WWN which is a storing area 421 storing an F-WWN value, a V-WWN which is a storing area 422 storing a V-WWN value, and an NV-WWN which is a storing area 423 storing an NV-WWN value.

The F-WWN is, for example, a predetermined area of a ROM, and the F-WWN value, which is a value in the F-WWN, is written in the area when the managed server 4 is shipped from a factory. The F-WWN value is a factory default value. The V-WWN is a predetermined area of a volatile memory such as a DRAM (Dynamic Random Access Memory), and the V-WWN value, which is a value of the V-WWN, is, for example, written in the predetermined area by the booting process. The NV-WWN is a predetermined area of a nonvolatile memory such as a flash memory, and the NV-WWN value, which is a value of the NV-WWN, is, for example, written in the predetermined area by the booting process.

In the HBA 42, the WWN value is caused to be effective according to the priority order. This priority order is set in this order: the V-WWN value; the NV-WWN value; and the F-WWN value. The F-WWN value is effective only when the V-WWN and the NV-WWN value are not set. The NV-WWN value is effective only when the V-WWN value is not set.

With regard to the WWN value, more specifically, the WWN value includes the WWNN value assigned for each node (that is, the HBA 42), and the WWPN value assigned for each of a plurality of the ports provided in the HBA 42. A wording "WWN value" denotes both of the WWNN value and the WWPN value.

Returning to FIG. 2, the management server 1 of the embodiment includes two NICs 11, a server managing unit 12, and a primary boot controlling unit 13. The server managing unit 12 includes a server management table 14. The primary boot controlling unit 13 includes a primary boot control object 15. The primary boot control object 15 is a storing unit (for example, a file) used by the primary boot controlling unit 13, and includes an HBA vender determining program 16, a plurality of HBA vender-dedicated programs 17, and a plurality of server definition files 18.

The NIC 11 is the communicating unit or the interface executing the communicating process with the managed server 4 through the management network 3 in the management server 1. The NIC 11 includes a first communicating unit (NIC 1), and a second communicating unit (NIC 2). Originally, the first communicating unit is mutually distinguished from the second communicating unit. However, in the embodiment, the first communicating unit is not distinguished in the process by the OS of the managing server 1. That is, the two NICs 11 execute the teaming with the OS of the management server 1. That is, the two NICs 11 operate as the one NIC 11 as cooperating with each other.

The server managing unit 12 controls the whole management server 1, and manages the managed server 4. The server management table 14 is used to control the whole management server 1 and to manage the managed server.

FIG. 4 illustrates an example of the server management table 14. The server management table 14 stores, for each (name of the) managed server 4, a MAC address, an IP address, the WWN value, condition information, power information, BMC (Baseboard Management Controller) information, and spare server information.

The MAC address includes a MAC 1, which is the MAC address of the NIC 41-1 of the managed server 4, and a MAC 2, which is the MAC address of the NIC 41-2 of the managed server 4. The IP address (ip) is the IP address of the managed server 4. As described above, the WWN value includes the WWNN value (WWNN) and the WVVPN value (WWPN). The condition information indicates whether the managed server 4 is normal (ok), or abnormal (ng). The power information indicates whether the managed server 4 is powered on or off. The BMC information indicates the IP address of the BMC to which the managed server 4 is connected. The spare server information indicates the server, that is, the stand-by computer (a server name of the spare computer), which should take over a job from the managed server 4 when the managed server 4 is stopped.

The primary boot controlling unit 13 is a first monitoring unit which receives the boot request from the managed server 4 to monitor the received boot request. When the primary boot controlling unit 13 receives the boot request from the first communicating unit NIC 41-1 of the managed server 4 based on a result of the monitoring for the boot request, the primary boot controlling unit 13 transmits the boot processing program to the managed server 4. That is, the primary boot controlling unit 13 responds to only the boot request from the managed server 4 including the MAC 1 registered in the server management table 14.

The HBA vender determining program 16 and the HBA vender-dedicated program 17 are the boot processing programs executing the booting process in the managed server 4. The boot processing program is a program which executes the booting process, and shifts the boot priority to the next. The server definition file 18 defines the WWN value of the managed server 4.

The HBA vender determining program 16 determines the vender of the HBA 42, and obtains the HBA vender-dedicated program 17 corresponding to the HBA 42 based on a result of the determination. The HBA vender-dedicated program 17 stores the WWN value in the V-WWN, and further encodes the WWN value to store the encoded WWN value in the NV-WWN.

The HBA vender determining program 16 is provided in advance. The HBA vender-dedicated programs 17, which quantity is the number of HBA venders, are provided in advance for each HBA vender. The server definition files 18, which quantity is the number of the managed servers 4, are generated for each managed server 4. The HBA vender determining program 16 and the HBA vender-dedicated program 17 are, for example, firmware.

FIG. 5 illustrates an example of the server definition file 18. As illustrated in FIG. 5A, the server definition file 18 stores, for each (server name of the) managed server 4, the WWN value (WWNN) of the HBA 42 of the managed server 4, and the WWN value (WWPN) of the port provided in the HBA 42 of the managed server 4. For example, FIG. 5B illustrates the server definition file 18 of the managed server 4 srv-2, and the server definition file 18 of the spare server srv-10.

Returning to FIG. 2, the recovery server 2 of the embodiment includes two NICs 21, a recovery managing unit 22, a secondary boot controlling unit 23, and a boot monitoring unit 24. The recovery managing unit 22 includes a recovery management table 25. The boot monitoring unit 24 includes a secondary boot control object 26. The secondary boot control object 26 includes a recovering program 27 and an NOP program 28. The recovering program 27 and the NOP program 28 are provided in advance.

The NIC 21 is the communicating unit or the interface executing the communicating process with the managed server 4 through the management network 3 in the recovery server 2. The configuration of the NIC 21 is the same as a configuration of the NIC 11 of the management server 1. That is, the two NICs 21 operate as the one NIC 21 as cooperating with each other by the process of the OS of the recovery server 2.

The recovery managing unit 22 controls the whole recovery server 2, and manages the managed server 4. Thus, the recovery management table 25 is used. The recovery management table 25 is a table storing, at least, addresses of the first and second communicating units NIC 41-1 and 41-2 of the managed server 4.

FIG. 6 illustrates an example of the recovery management table 25. The recovery management table 25 stores the MAC 1, the MAC 2, the IP address, and a MAC 1 boot time for each (server name of the) managed server 4. As described later, the MAC 1 boot time is a receiving time (hereinafter, NIC 41-1 boot time) of a broadcast response (the first boot response) of the management server 1 for the boot request from the corresponding MAC 1.

The secondary boot controlling unit 23 (and the boot monitoring unit 24) is a second monitoring unit which receives the boot request from the managed server 4, and the broadcast response (the first boot response) of the management server 1 for the boot request from the managed server 4, and monitors the boot request and the broadcast response. When the secondary boot controlling unit 23 receives the boot request from the second communicating unit NIC 41-2 of the managed server 4, the secondary boot controlling unit 23 transmits the recovering program 27 to the managed server 4 based on a result of the monitoring for the boot request and the boot response (hereinafter, simply referred to the boot request). That is, the secondary boot controlling unit 23 responds to only the boot request from the managed server 4 including the MAC 2 registered in the recovery management table 25.

The recovering program 27 is the recovering program executing the recovering process, and shifts the boot priority to the next. The recovering process is executed by the secondary boot controlling unit 23 only when the management server 1 is not operating. That is, the NV-WWN of the managed server 4 is read, and when a value is set in the NV-WWN, the set value is decoded to be recovered to the V-WWN, and the HBA 42 is re-initialized. The NOP program 28 is a program that does not execute the recovering process (does not execute an operation), and shifts the boot priority to the next. The recovering program 27 and the NOP program 28 are, for example, firmware.

When the monitoring unit 24 receives the broadcast response (the first boot response) of the management server 1 for the boot request from the first communicating unit NIC 41-1 of the managed server 4 based on a result of the monitoring for the boot request in the secondary boot controlling unit 23, the monitoring unit 24 records the boot response in the recovery management table 25. Specifically, the corresponding receiving time is stored in the recovery management table 25.

When the secondary boot controlling unit 23 receives the boot request from the second communicating unit NIC 41-2 of the managed server 4, and when the predetermined time has not elapsed from the receiving time stored in the recovery management table 25, the secondary boot controlling unit 23 determines that the management server is normal. In this case, the secondary boot controlling unit 23 transmits the NOP program 28 to the managed server 4. When the secondary boot controlling unit 23 receives the boot request from the second communicating unit NIC 41-2 of the managed server 4, and when the predetermined time has elapsed from the receiving time stored in the recovery management table 25, the secondary boot controlling unit 23 determines that the managing server 1 is stopped. In this case, the secondary boot controlling unit 23 transmits the recovering program 27 to the managed server 4.

Figure 7:
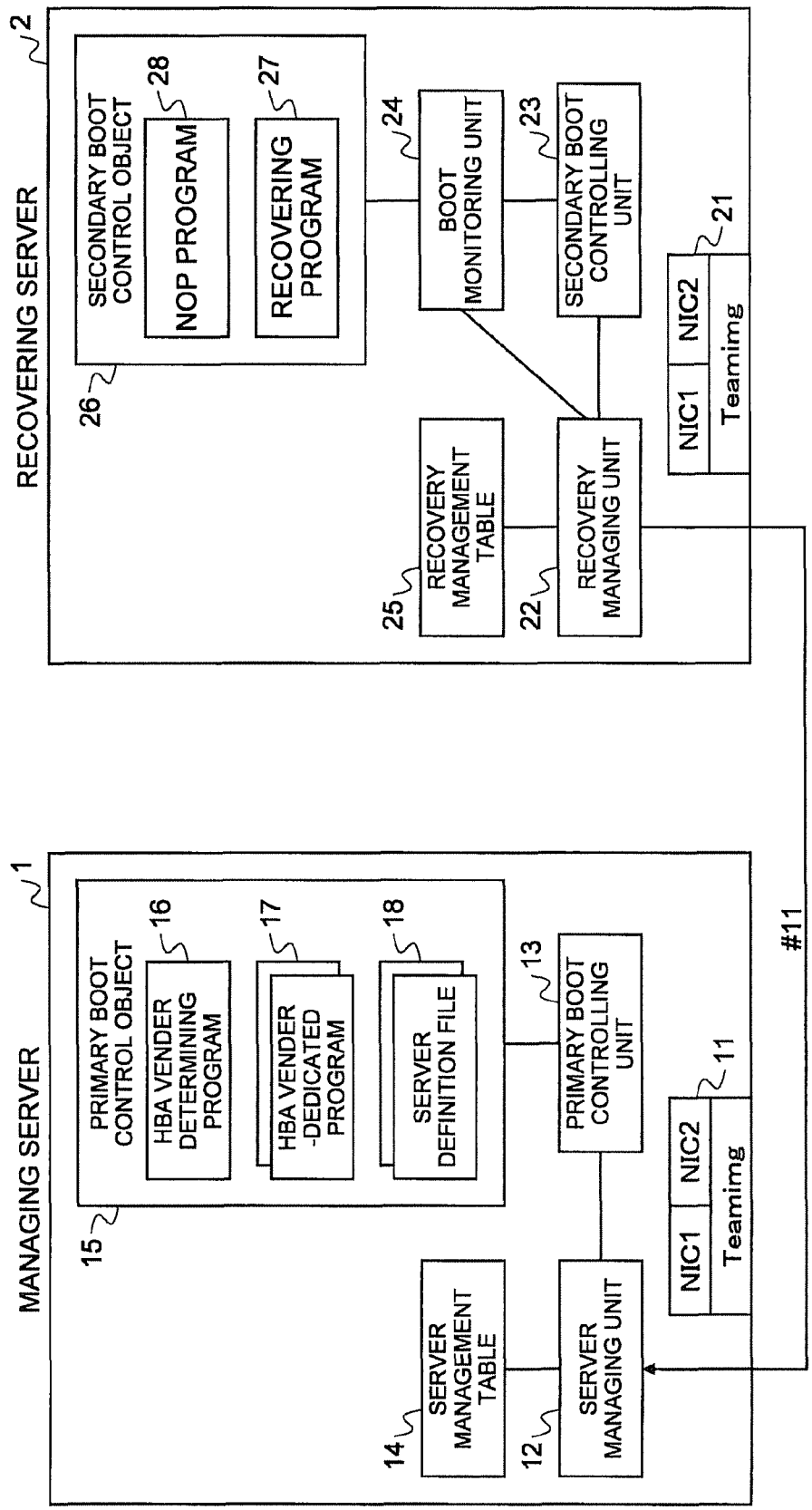
FIG. 7 illustrates a process when the management server and a recovery server are normal.
Figure 8:
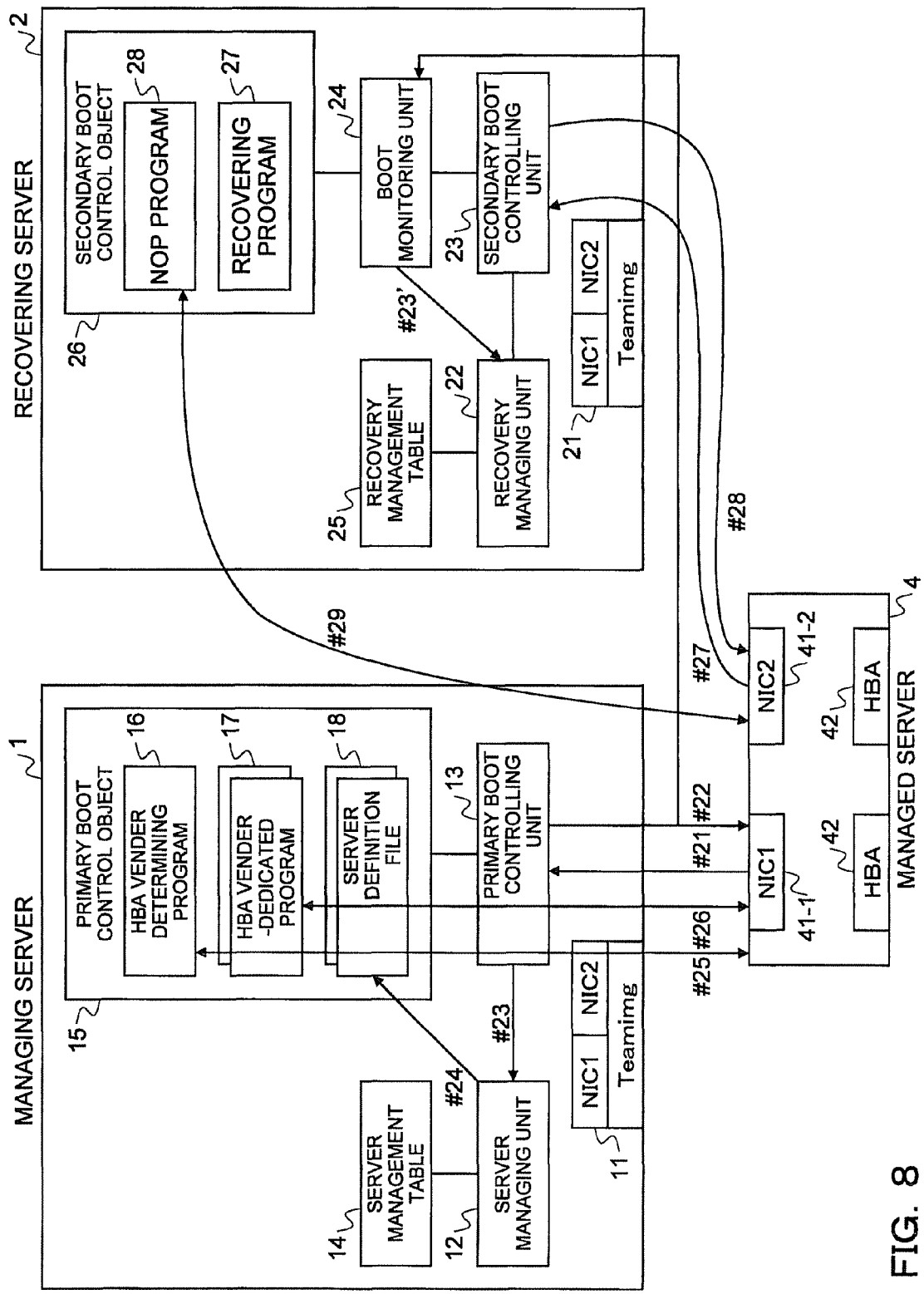
FIG. 8 illustrates a booting process in the managed server when the management server and the recovery server are normal.
Figure 9:
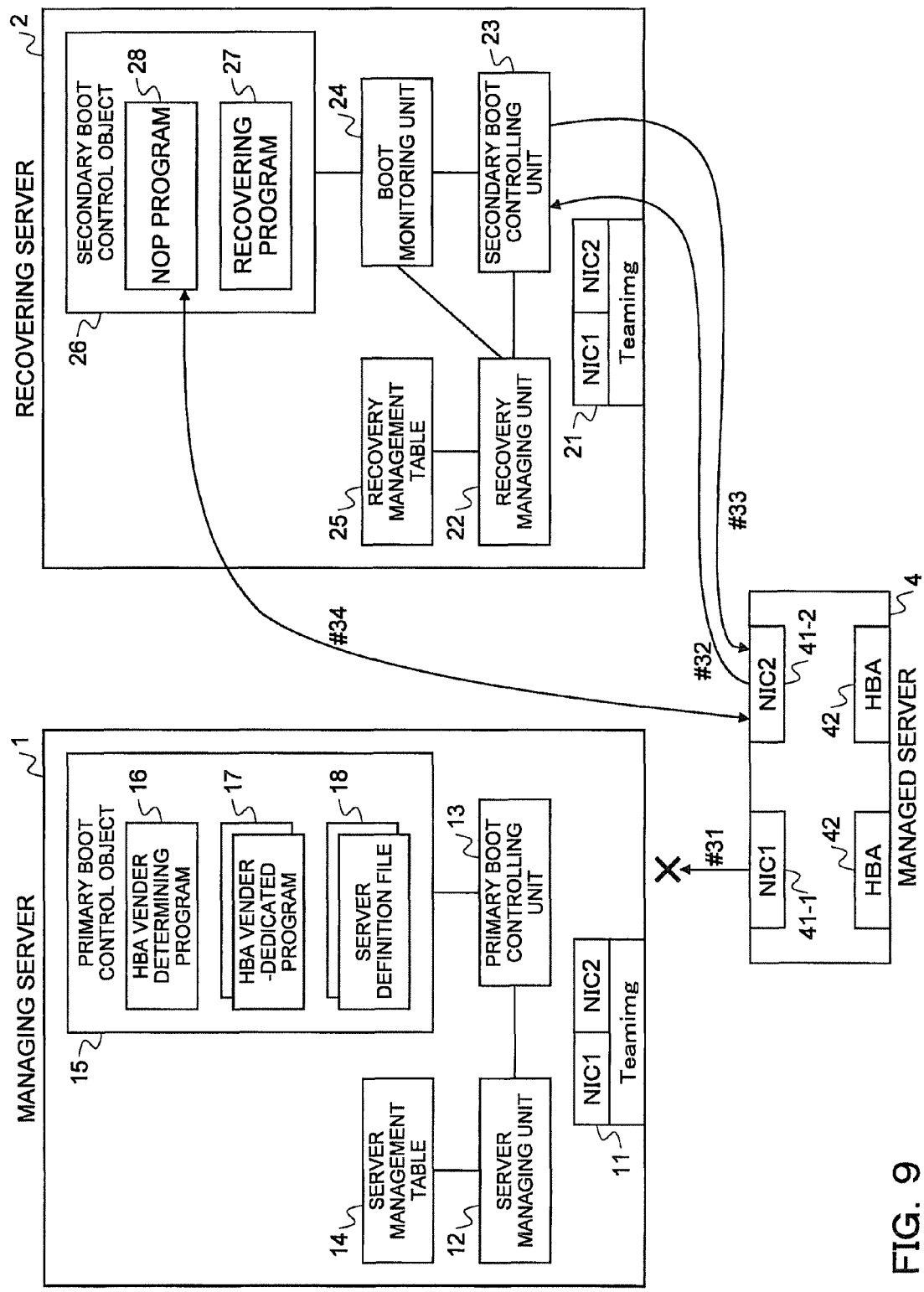
FIG. 9 illustrates the booting process in the managed server when the management server is stopped and the recovery server normally operates.

FIG. 7 to FIG. 9 illustrates the processes in the redundant computer system in the SAN environment of the embodiment.

FIG. 7 illustrates the process when the management server 1 and the recovery server 2 are normal. In this case, the managed server 4 does not execute the booting process. Thus, the recovery server 2 periodically executes only a polling operation to the managing server 1.

When the recovery server 2 starts the process, the recovery managing unit 22 executes the polling operation to the server managing unit 12 of the management server 1 through the management network 3 (#11). The polling operation is repeatedly executed in a predetermined time interval. The time interval is, for example, one minute, or may be also another value.

As a result of the polling operation, the recovery managing unit 22 of the recovery server 2 obtains a content of the server management table 14 from the management server 1, and updates the recovery management table 25 based on the obtained content. The obtained content of the server management table 14 includes, for example, the server name, the MAC 1, the MAC 2, and an IP.

FIG. 8 illustrates the process when the management server 1 and the recovery server 2 are normal, but the managed server 4 executes the booting process. Even in this case, the recovery server 2 executes the polling operation to the managing server 1, but the illustration of the polling operation is omitted in FIG. 8.

By issuing the boot request from the NIC 41-1, the managed server 4 tries to network-boot from the NIC 1 (#21). The boot request is broadcasted to the whole management network 3. In this case, since the management server 1 is normal, the management server 1 receives the boot request from the NIC 41-1.

In the management server 1, the primary boot controlling unit 13 receives the first boot request from the NIC 41-1, and returns the first boot response to the NIC 41-1 of the managed server 4 (#22). The response is broadcasted to the whole managing network 3. Further, the primary boot controlling unit 13 transfers the received boot request from the NIC 41-1 to the server managing unit 12 (#23).

On the other hand, in the recovery server 2, the secondary boot controlling unit 23 receives the broadcast response (the first boot response) of the management server 1 for the boot request (the first boot request) from the NIC 41-1, and transfers the received broadcast response to the boot monitoring unit 24. Since the received boot response is the boot response to the NIC 41-1, the boot monitoring unit 24 transfers the receiving time (the NIC 41-1 boot time) of the boot response to the recovery managing unit 22. The recovery managing unit 22 causes the received NIC 41-1 boot time to be recorded in the MAC 1 boot time of the recovery management table 25 (#23').

In the management server 1, when the server managing unit 12 receives the boot request from the primary boot controlling unit 13, the server managing unit 12 generates the server definition file 18 in the primary boot control object 15 (#24), and reads out the HBA vender determining program 16 to transmit the read out HBA vender determining program 16 to the NIC 41-1 of the managed server 4 (#25).

The managed server 4 executes the received HBA vender determining program 16, and when a type of the vender is matched, the managed server 4 reads out the HBA vender-dedicated program 17 from the management server 1, and the NIC 41-1 of the managed server 4 receives the read out HBA vender-dedicated program 17 (#26).

Thereby, the managed server 4 executes the HBA vender-dedicated program 17. Thereby, the managed server 4 updates the WWN value, and initializes the HBA 42. Then, the managed server 4 updates (or increments) the priority for the booting process to the next according to the predetermined (or fixed) order. That is, the control is moved to the boot process whose priority is next to the boot priority that has been set at that time, and the boot process is executed. In this case, since the boot request is issued from the NIC 41-1 at the #21, the process for the current priority is the "NIC 1 boot", thus, the "NIC 2 boot" is executed, which is the process for the next priority.

After that, since the HBA 42 is initialized, when the managed server 4 issues the boot request from the NIC 41-2, which has the new priority (#27), the secondary boot controlling unit 23 of the recovery server 2 returns the response to the NIC 41-2 (#28).

After that, in the recovery server 2, the secondary boot controlling unit 23 transfers the received boot request from the NIC 41-2 to the boot monitoring unit 24. Since the received boot request is the boot request of the NIC 41-2, the boot monitoring unit 24 executes the process based on the NIC 41-2 boot time.

That is, when the time (the NIC 41-2 boot time) the boot request is received from the NIC 41-2 is within a predetermined time from the NIC 41-1 boot time, the boot monitoring unit 24 determines that the management server 1 is normally operating, and it is succeeded in rewriting the WWN value in the boot process from the NIC 41-1. Thus, the boot monitoring unit 24 transmits the NOP program to the managed server 4 (#29), and clears the NIC 41-1 boot time recorded in the MAC 1 boot time of the recovery management table 25. The predetermined time is, for example, 10 minutes, or may be also another value.

When the managed server 4 receives the NOP program 28, the managed server 4 moves the control (control right) to this NOP program 28 to execute this NOP program 28 on the BIOS 43. The NOP program 28 moves the control to the process for the next boot priority. In this case, since the managed server 4 receives the NOP program 28 in the booting process in the NIC 41-2, the process for the current priority is the "NIC 2 boot". Thus, the process for the "SAN boot", which is the next priority, is executed. Thereby, the NOP program 28 can change the booting process according to the predetermined boot priority order, and the managed server 4 can execute the SAN boot by using the rewritten WWN value.

FIG. 9 illustrates the process when the managing server 1 is stopped, the recovery server 2 normally operates, and the managed server 4 executes the booting process. Even in this case, while the recovery server 2 executes the polling operation to the management server 1, the illustration of the polling operation is omitted in FIG. 9.

By issuing the boot request (the first boot request) from the NIC 41-1, the managed server 4 tries to network-boot from the NIC 41-1 (#31). However, in this case, since the management server 1 is stopped, the management server 1 does not receive the boot request from the NIC 41-1. Thus, the NIC 41-1 of the managed server 4 does not also receive the response from the management server 1.

Thus, the managed server 4 issues the boot request (the second boot request) from the NIC 41-2 (#32). The boot request is broadcasted to the whole management network 3. In this case, since the recovery server 2 is normal, the recovery server 2 receives the boot request from the NIC 41-2.

In the recovery server 2, the secondary boot controlling unit 23 receives the boot request from the NIC 41-2, and returns the response (the second boot response) to the NIC 41-2 of the managed server 4 (#33). The response is broadcasted to the whole managing network 3.

The secondary boot controlling unit 23 receives the boot request from the NIC 41-2, and transfers the received boot request to the boot monitoring unit 24. Since the received boot request is the boot request of the NIC 41-2, the boot monitoring unit 24 reads out the recovering program 27 from the secondary boot control object 26, and transmits the read out recovering program 27 to the NIC 41-2 of the managed server 4 (#34).

When the NIC 41-2 boot time has elapsed from the NIC 41-1 boot time by a predetermined time, or when the NIC 41-1 boot time is "0", the boot monitoring unit 24 determines that the management server 1 is stopped. This stop is caused for any reason. Thus, it is considered that the management server 1 does not normally operate, and it is failed to rewrite the WWN value in the NIC 41-1. Thus, the boot monitoring unit 24 transmits the recovering program 27 to the managed server 4, and clears the NIC 41-1 boot time recorded in the MAC 1 boot time.

More specifically, such a case that the NIC 41-1 boot time is "0", for example, corresponds to such a case that, after the factory shipment, only the F-VVWN value is set and the management server 1 has not ever operated normally.

When the managed server 4 receives the recovering program 27, the managed server 4 moves the control to the received recovering program 27 to execute the received recovering program 27 on the BIOS 43. The recovering program 27 checks whether or not the value is included in the NV-WWN of the HBA 42, and when the value is included, the recovering program 27 decodes the NV-WWN (the NV-WWNN and the NV-WWPN), and sets the result (decode) value of the decoding in the V-WWN. After that, the recovering program 27 initializes the HBA 42, and moves the control to the process for the next priority. In this case, the process for the current priority is the "NIC 2 boot", thus, the "SAN boot", whose priority is the next, is executed. Thereby, the managed server 4 can SAN-boot by using the rewritten WWN value.

Alternatively, when the value is not included in the NV-WWN of the HBA 42, the managed server 4 directly moves the control to the process for the next priority. This case corresponds to a case that the F-WWN value are used as the WWN value of the HBA 42, and a case that the WWN value is not controlled, that is, a case that an address (I/O address) of the managed server 4 is not virtualized.

Figure 10:
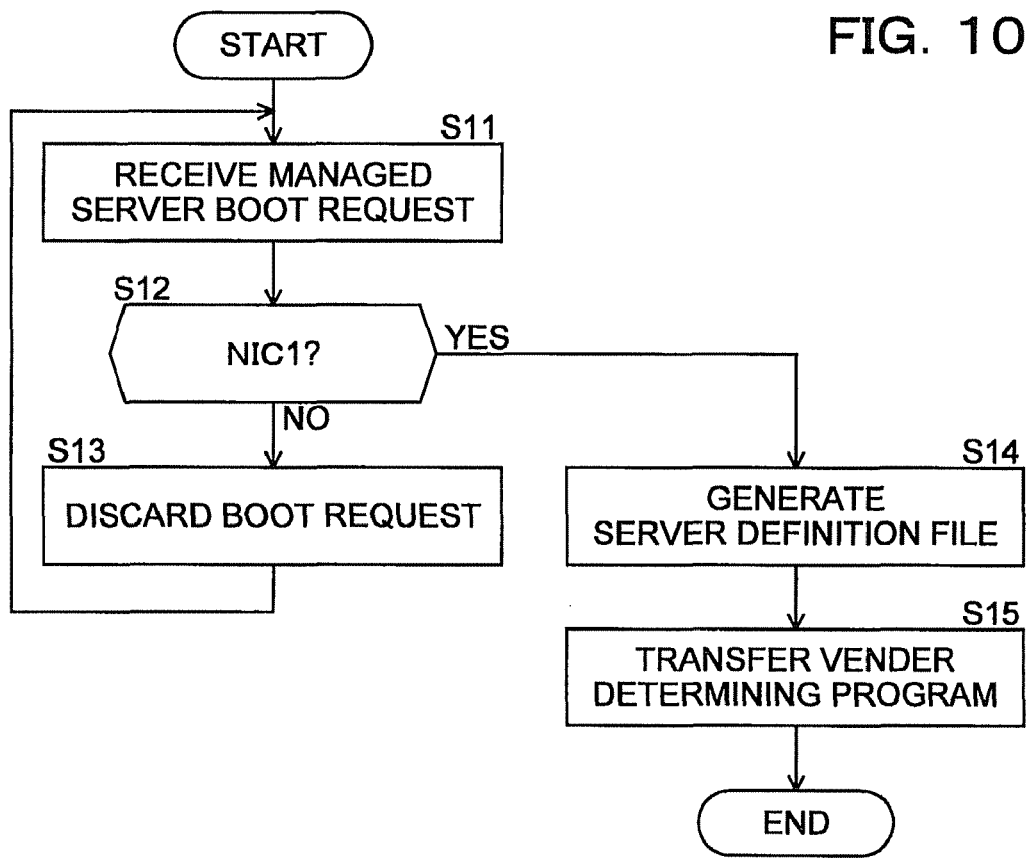
FIG. 10 illustrates a processing flow for the booting process executed by a server managing unit.
Figure 11:
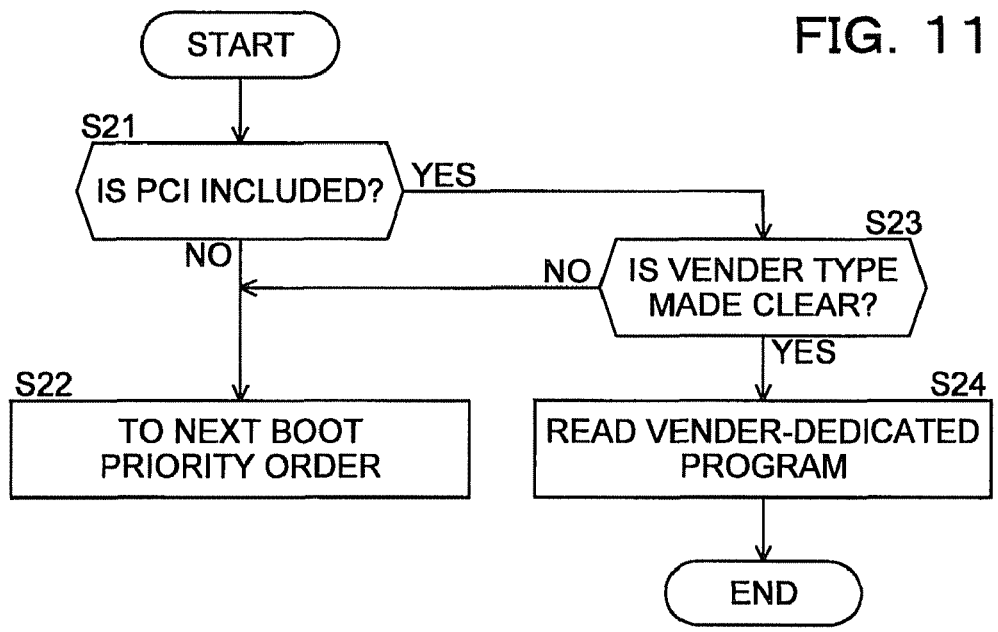
FIG. 11 illustrates a processing flow for a vender determining process executed by an HBA vender determining program.
Figure 12:
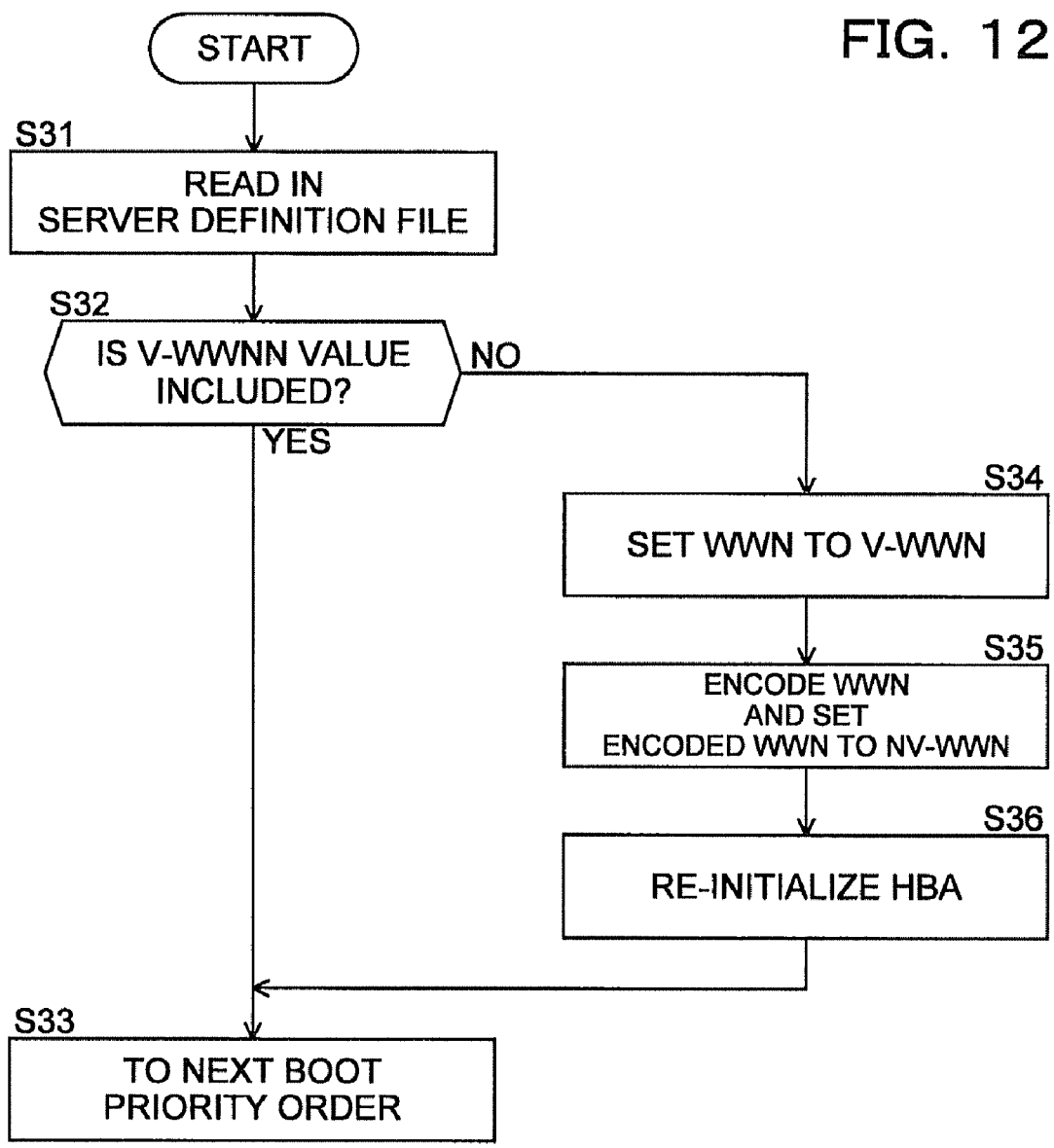
FIG. 12 illustrates a processing flow for a vender-dedicated process executed by an HBA vender-dedicated program.

FIG. 10 to FIG. 12 illustrates server managing process flows executed by the management server 1.

FIG. 10 illustrates a processing flow for the booting process executed by the server managing unit 12 of the management server 1 when the management server 1 is operating.

When the server managing unit 12 receives the boot request from the managed server 4 through the primary boot controlling unit 13 (step S11), the server managing unit 12 checks whether or not the received boot request is the boot request from the NIC 41-1 (step S12). When the received boot request is not the boot request from the NIC 41-1, after discarding the received boot request (step S13), the management server 1 repeats the steps following the step S11. When the received boot request is the boot request from the NIC 41-1, the management server 1 generates the server definition file 18 (step S14), and transmits the boot request to the HBA vender determining program 16 (step S15).

FIG. 11 illustrates a processing flow for a vender determining process executed on the BIOS 43 of the managed server 4 by the HBA vender determining program 16 transmitted to the managed server 4.

When the server managing unit 12 transmits the HBA vender determining program 16 to the BIOS 43 in the step S15, the HBA vender determining program 16 checks on the BIOS 43 whether or not a PCI (Peripheral Component Interface) is equipped (step S21). When the PCI is not detected, the HBA vender determining program 16 causes the effective booting process (to which the control is to be moved) to shift to the booting process of the next priority from the priority which has been set at the time point (step S22). When the PCI is detected, the HBA vender determining program 16 further checks whether or not a type of the vender can be matched by using a vender ID and a device ID included in the PCI of the managed server 4 (step S23). The vender ID uniquely specifies the vender. The device ID specifies HBA card model of the vender. Thus, the type of the vender can be specified with the vender ID and the device ID. When the type of the vender is not a HBA vender, the HBA vender determining program 16 executes the step S22. When the type of the vender is a HBA vender, the HBA vender determining program 16 reads the HBA vender-dedicated program 17 corresponding to the vender from the managing server 1 (step S24).

FIG. 12 illustrates a processing flow for a vender-dedicated process executed on the BIOS 43 of the managed server 4 by the HBA vender-dedicated program 17 transmitted to the managed server 4.

When the HBA vender-dedicated program 17 is read on the BIOS 43 in the step S24, the HBA vender-dedicated program 17 reads the server definition file 18 (step S31), and checks whether or not the V-WWNN value is set (step S32). When the V-WWNN value is set, the HBA vender-dedicated program 17 causes the booting process to shift to the booting process of the next priority from the priority that has been set at the time point (step S33). When the V-WWNN value is not set, the HBA vender-dedicated program 17 sets the WWN value to the V-WWN (step S34), and encodes the WWN value to set the encoded WWN value to the NV-WWN (step S35). By encoding the WWN value, it is possible to store the correct WWN value in such a format that the value is not the WWN value, and to decode the stored WWN value in the recovering process to use the decoded WWN value. That is, it is possible to prevent the encoded value of the stored WWN value from being confused with other WWN value. After that, the HBA vender-dedicated program 17 re-initializes the HBA 42 (step S36), and executes the step S33.

Figure 13:
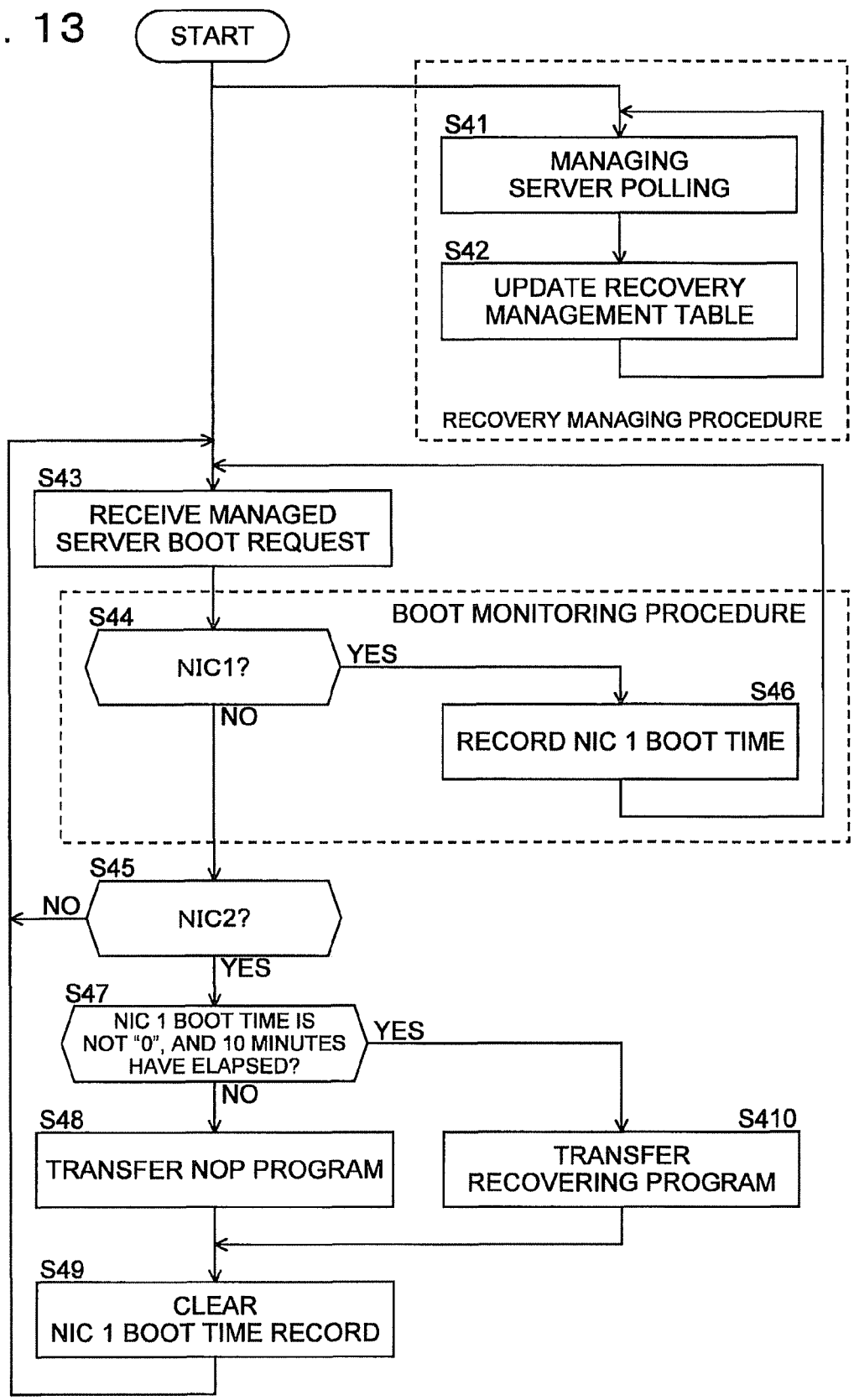
FIG. 13 illustrates a processing flow for the booting process executed by a recovery managing unit.

FIG. 13 illustrates a processing flow for the booting process executed by the recovery managing unit 22 of the recovery server 2 when the management server 1 is stopped.

The recovery managing unit 22 executes the polling operation for the server managing unit 12 of the management server 1 (step S41), updates the recovery management table 25 based on information received from the server managing unit 12 by the polling operation (step S42), and repeats the steps following the step S41 in a predetermine time interval. The steps S41 and S42 correspond to a recovery managing procedure executed by the recovery managing unit 22.

On the other hand, when the boot monitoring unit 24 receives the boot request from the managed server 4 through the secondary boot controlling unit 23 (step S43), the boot monitoring unit 24 checks whether or not the received boot request is the boot request from the NIC 41-1 (step S44). When the received boot request is not the boot request from the NIC 41-1, the boot monitoring unit 24 further checks whether or not the received boot request is the boot request from the NIC 41-2 (step S45). When the received boot request is not the boot request from the NIC 41-2, the boot monitoring unit 24 repeats the steps following the step S43.

When the received boot request is the boot request from the NIC 41-1 in the step S44, after recording the time (the NIC 41-1 boot time) when the broadcast response (the first boot response) of the management server 1 for the boot request from the NIC 41-1 is received (step S46), the boot monitoring unit 24 repeats the steps following the step S43. The steps S44 and S46 correspond to a boot monitoring procedure executed by the boot monitoring unit 24.

When the received boot request is the boot request from the NIC 41-2 in the step S45, the boot monitoring unit 24 checks whether or not the NIC 41-1 boot time is not "0", and also a period of "10 minutes" has elapsed from the NIC 41-1 boot time (step S47). When the NIC 41-1 boot time is "0", or when the period of "10 minutes" has elapsed from the NIC 41-1 boot time, the boot monitoring unit 24 transmits the NOP program 28 to the managed server 4 (step S48), and clears the record of the NIC 41-1 boot time (step S49). Then, the boot monitoring unit 24 repeats the step S43 and its following steps. In the step S47, when the NIC 41-1 boot time is not "0", and also the period of "10 minutes" has elapsed, the boot monitoring unit 24 transmits the recovering program 27 to the managed server 4 (step S410), and executes the step S49. Then, the boot monitoring unit 24 repeats the step S43 and its following steps. In other words, the step S45 and the steps S47 to S410 correspond to a boot controlling procedure.

FIG. 14 and FIG. 15 illustrate processing flows for the booting process executed by the managed server 4.

FIG. 14 illustrates the processing flow for the booting process executed on the BIOS 43 of the managed server 4 by the NOP program 28 transmitted to the managed server 4.

When the managed server 4 receives the NOP program 28 transmitted in the step S410, the managed server 4 (the BIOS 43 of the managed server 4) executes the received NOP program 28 on the BIOS 43, and causes the booting process to shift to the booting process of the next priority from the priority which has been set at the time point (step S51).

FIG. 15 illustrates the processing flow for the booting process executed on the BIOS 43 of the managed server 4 by the recovering program 27 transmitted to the managed server 4.

When the managed server 4 (the BIOS 43 of the managed server 4) receives the transmitted recovering program 27 in the step S48, the BIOS 43 executes the received recovering program 27 on the BIOS 43. That is, the recovering program 27 checks whether or not a data NV-WWN value is set (step S61). When the data NV-WWN value is not set, the recovering program 27 causes the booting process to shift to the booting process of the next priority from the priority that has been set at the time point (step S62). When the data NV-WWN value is set, the recovering program 27 decodes the data NV-WWN value, and sets a result of the decoding to the V-WWN (step S63). As described above, the recovering program 27 decodes the value, which is obtained by previously encoding the WWN value used by the managed server 4, in the managed server 4 that is the transmission destination. Thereby, the recovering program 27 recovers the WWN value set by the HBA vender-dedicated program 17. After that, the recovering program 27 re-initializes the HBA 42 (step S64), and executes the step S62.

For example, in the HBA 42 of a managed server 4 (for example, srv-2), only the F-WWN value is set in the factory shipment, and the management server 1 sets (rewrites) the WWN value as the V-WWN value in the starting process for the managed server 4. After that, it is assumed that a job of the managed server 4 (srv-2) is taken over by another managed server 4 (for example, srv-10) because of some cause.

When the management server 1 is normal, even in the HBA 42 of another managed server 4 (srv-10), the management server 1 correctly set the WWN value. For example, when the managed server 4 (srv-10) is powered on, the network boot is started from the NIC 41-1 of the managed server 4 (srv-10), and the above processes of the FIG. 10 to FIG. 12 are executed as following the starting. After that, in the managed server 4 (srv-10), by the step S33 of FIG. 12, the control is moved to the network boot of the NIC 41-2 whose priority is the next, and the network boot is executed. The above processes of FIG. 13 to FIG. 14 are executed according to the executing. As a result, by the step S51 of FIG. 14, in the managed server 4 (srv-10), the control is moved to the SAN boot whose priority is the next, and the SAN boot is executed. Thus, the managed server 4 (srv-10) executes the SAN boot.

On the other hand, when the management server 1 is stopped, since the managed server 4 (srv-10) cannot directly rewrite the WWN value, the managed server 4 (srv-10) cannot execute the SAN boot. In this case, the managed server 4 recovers the WWN value with the recovery server 2, and the managed server 4 connects to the storage 6 to execute the SAN boot. For example, when the managed server 4 (srv-10) is powered on, while the network boot (the first boot) is started from the NIC 41-1 of the managed server 4 (srv-10), the response (the first boot response) from the management server 1 cannot be obtained. Thus, in the BIOS 43 of the managed server 4 (srv-10), a timeout of the first boot occurs, and the network boot (the second boot) is started from the NIC 41-2, whose priority is the next. As followed by the starting the network boot, the above processes of FIG. 13 and FIG. 15 are executed. As a result, by the step S62 of FIG. 15, in the managed server 4 (srv-10), the control is moved to the SAN boot, whose priority is the next, and this SAN boot is executed. Thus, the managed server 4 (srv-10) executes this SAN boot.

Second Embodiment

According to the redundant computer system in the SAN environment of FIG. 2, the primary boot controlling unit 13 executes a determining process for a condition of the management server 1 based on a receiving time when the first boot response of the management server 1 for the first boot request is received from the managed server 4. Thereby, even when the management server 1 is stopped because of hardware fault or software fault, the managed server 4 can boot up the program such as OS from the storage through the SAN.

More specifically, in the redundant computer system in the SAN environment of FIG. 2, consideration may be given to a condition that the management server 1 is neither stopped nor operating normally. This is, for example, a condition that the primary boot controlling unit 13 is normally operating, but only the server managing unit 12 is not normally operating because of the software fault. In this case, since the management server 1 is neither stopped nor operating normally, the management server 1 should not deliver the first boot response for the first boot request from the managed server 4 onto the management network 3.

However, in the redundant computer system in the SAN environment of FIG. 2, when the first boot request from the NIC 41-1 is received, the primary boot controlling unit 13 of the management server 1 broadcasts the first boot response to the NIC 41-1 of the managed server 4 to the whole of the management network 3. In response to this, the secondary boot controlling unit 23 of the recovery server 2 receives the first boot response by the broadcast.

As a result, when the second boot request from the NIC 41-2 of the managed server 4 is received, the recovery server 2 determines that a predetermined time has not elapsed from the receiving time when the first boot response is received, in other words, the management server 1 is supposed to be operating normally. Thus, the recovery server 2 transmits the NOP program 28, which does not execute a recovery process, to the managed server 4. On the other hand, since the server managing unit 12 is not operating, the management server 1 can not also execute the boot request. Thus, the managed server 4 can not boot up from the management server 1 as well as the recovery server 2.

However, when the server managing unit 12 is normally operating, but only the primary boot controlling unit 13 is not normally operating because of software fault, the first boot response can not be broadcasted. So the above problem does not happen.

Thus, in the second embodiment, the primary boot controlling unit 13 executes the following process.

With regard to the primary boot controlling unit 13, more specifically, when the boot request (the first boot request) from the first communicating unit NIC 41-1 of the managed server 4 is received, the primary boot controlling unit 13 transmits the first boot response, which is the response for the first boot request, to the management network 3 by broadcast. After transmitting this first boot response, the primary boot controlling unit 13 responds to the boot request from the managed server 4, for example.

More specifically, after the first boot request from the managed server 4 is received, the primary boot controlling unit 13 determines whether or not the management server 1 is operating normally. This determining process is executed before the first boot response is transmitted. Based on a result of this determining process, when the management server 1 is not operating normally, the primary boot controlling unit 13 outputs information indicating that the management server 1 is not operating normally. This information is, for example, an alarm or the like, which notifies a system administrator as soon as the error event is detected. This information is notified by outputting a log, or by sending an e-mail to a predetermined address, for example. When the management server 1 is operating normally, the primary boot controlling unit 13 transmits the first boot response to the management network 3 by broadcast in a similar way to the first embodiment.

Specifically, when the first boot request from the managed server 4 is received, the primary boot controlling unit 13 determines whether or not the server managing unit 12 is operating normally. Thus, when the first boot request is received, the primary boot controlling unit 13 sends a response request such as "alive query" to the server managing unit 12. The server managing unit 12 receiving the "alive query" sends back a response such as "alive" to the primary boot controlling unit 13. When the server managing unit 12 is not operating normally because of the software fault, for example, the server managing unit 12 can not send back the "alive" to the primary boot controlling unit 13.

After the "alive query" has been sent out, the primary boot controlling unit 13 waits for the "alive" response from the server managing unit 12 until expiring a predetermined timeout period. Thereby, the primary boot controlling unit 13 can know whether or not the server managing unit 12 is operating normally.

Alternatively, when the server managing unit 12 is not operating normally, the primary boot controlling unit 13 may restart the server managing unit 12. In this case, it is assumed that the timeout value is adequately shorter than the predetermined timeout period of the above first boot. Thereby, if the server managing unit 12 is able to be restarted normally, the managed server 4 keeps on processing without knowing this fact. The server managing unit 12 may be tried to restart up to a predetermined number of times, for example three times.

Due to the processing performed in the management server 1, when the second boot request from the NIC 41-2 of the managed server 4 is received, the recovery server 2 determines that the predetermined time has elapsed from the receiving time when the first boot response has been received, in other words, the management server 1 is not operating normally. Thus, the recovery server 2 transmits the recovering program 27, which executes the recovery process, to the managed server 4. Thereby, when the management server 1 is neither stopped nor operating normally, the managed server 4 can execute, with the recovering program 27, the boot request (for example, the boot from the SAN) to be executed next to the boot request from the first and second communicating units.

Further, in the second embodiment, the secondary boot controlling unit 23 is also executes the following process in a similar way to the primary boot controlling unit 13.

When the boot request (the second boot request) from the second communicating unit NIC 41-2 of the managed server 4 is received, the secondary boot controlling unit 23 transmits the second boot response, which is the response for the second boot request, to the management network 3 by broadcast.

After transmitting this second boot response, the secondary boot controlling unit 23 transmits the recovering program 27 to the corresponding managed server 4.

More specifically, after the second boot request from the managed server 4 is received, the secondary boot controlling unit 23 determines whether or not the recovery server 2 is operating normally. This determining process is executed before the second boot response is transmitted. Based on a result of this determining process, when the recovery server 2 is not operating normally, the secondary boot controlling unit 23 outputs information indicating that the recovery server 2 is not operating normally. This information is, for example, an alarm or the like, which notifies the system administrator as soon as the error event is detected. When the recovery server 2 is operating normally, the secondary boot controlling unit 23 transmits the second boot response to the management network 3 by broadcast in a similar way to the first embodiment.

Specifically, when the second boot request from the managed server 4 is received, the secondary boot controlling unit 23 determines whether or not a recovery managing unit 22 is operating normally. Thus, when the second boot request is received, the secondary boot controlling unit 23 sends the response request such as the "alive query" to the recovery managing unit 22. The recovery managing unit 22 receiving the "alive query" sends back the response such as "alive" to the secondary boot controlling unit 23. When the recovery managing unit 22 is not operating normally because of the software fault, for example, the recovery managing unit 22 can not send back the "alive" to the secondary boot controlling unit 23.

More specifically, after the "alive query" has been sent out, the secondary boot controlling unit 23 waits for the "alive" response from the recovery managing unit 22 until expiring a predetermined timeout period. Thereby, the secondary boot controlling unit 23 can know whether or not the recovery managing unit 22 is operating normally. As a result, when the recovery server 2 is neither stopped nor operating normally, the secondary boot controlling unit 23 can know this fact.

Alternatively, when the recovery managing unit 22 is not operating normally, the secondary boot controlling unit 23 may restart the recovery managing unit 22. In this case, it is assumed that the timeout value is adequately shorter than the predetermined timeout period of the first boot. Thereby, if the recovery managing unit 22 is able to be restarted normally, the managed server 4 keeps on processing without knowing this fact. The recovery managing unit 22 may be tried to restart up to a predetermined number of times, for example, three times.

Figure 16:
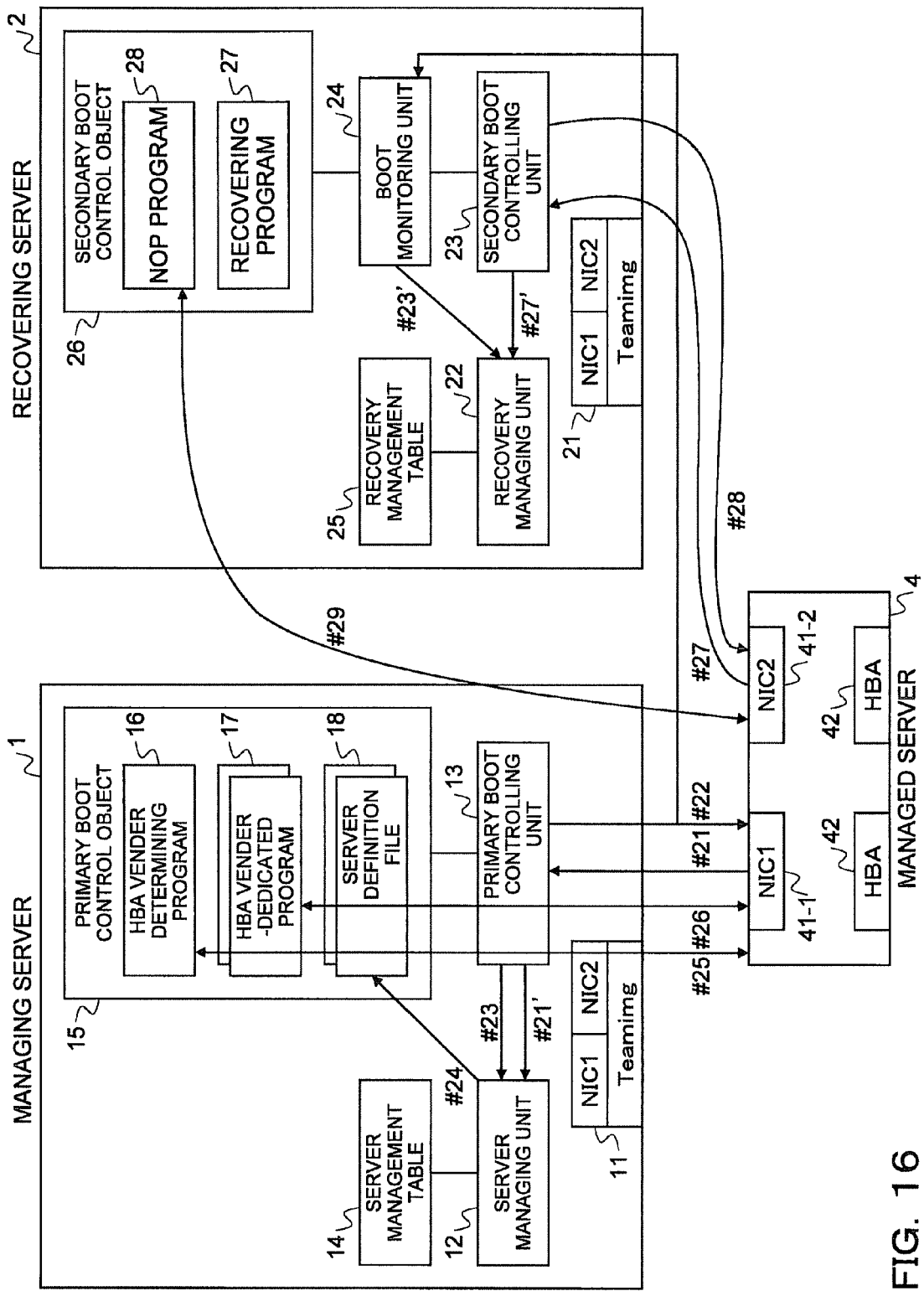
FIG. 16 illustrates another example of booting process in the managed server when the management server and the recovery server are normal.

FIG. 16 illustrates an example of the booting process in the managed server 4 when both the management server 1 and the recovery server 2 are operating normally. In this case, the recovery server 2 also executes such a polling that described in the above first embodiment to the management server 1, it is omitted to illustrate the polling operation in FIG. 16.

The managed server 4 tries to network-boot from the NIC 1 by issuing the boot request from the NIC 41-1 in a similar way to the process #21 in FIG. 8 (#21). In this case, since the primary boot controlling unit 13 of the management server 1 is operating normally, the primary boot controlling unit 13 receives the boot request from the NIC 41-1.

In the management server 1, when the boot request from the NIC 41-1 is received, the primary boot controlling unit 13 sends the "alive query" to the server managing unit 12. More specifically, after the "alive query" has been sent out, the primary boot controlling unit 13 waits for the "alive" response from the server managing unit 12 until expiring a predetermined timeout period (#21').

When the "alive" is not received from the server managing unit 12, the primary boot controlling unit 13 notifies the system administrator of the occurrence of an error and may abort the process. When the "alive" is received from the server managing unit 12, the primary boot controlling unit 13 returns the first boot response to the NIC 41-1 of the managed server 4 in a similar way to the process #22 of FIG. 8 (#22). After that, the processes #23 to #26 are executed in a similar way to FIG. 8.

After that, since the HBA 42 is initialized, the managed server 4 issues the boot request from the NIC 41-2, which has the next priority to the NIC 41-1 (#27). In this case, since the secondary boot controlling unit 23 of the recovery server 2 is operating normally, the secondary boot controlling unit 23 receives the boot request from the NIC 41-2.

In the recovery server 2, when the boot request from the NIC 41-2 is received, the secondary boot controlling unit 23 sends the "alive query" to the recovery managing unit 22. More specifically, after the "alive query" has been sent out, the secondary boot controlling unit 23 waits for the "alive" response from the recovery managing unit 22 until expiring a predetermined timeout period (#27').

When the "alive" is not received from the recovery managing unit 22, the secondary boot controlling unit 23 notifies the system administrator of the occurrence of an error and may abort the process. When the "alive" is received from the recovery managing unit 22, the secondary boot controlling unit 23 returns the second boot response to the NIC 41-2 of the managed server 4 in a similar way to the process #28 of FIG. 8 (#28). After that, the process #29 is executed in a similar way to FIG. 8.

With regard to the process #27', more specifically, as illustrated in FIG. 9, even when the management server 1 is stopped, the recovery server 2 normally operates, and the managed server 4 executes the booting process, the process #27' of FIG. 16 is executed before the process #28.

Figure 17:
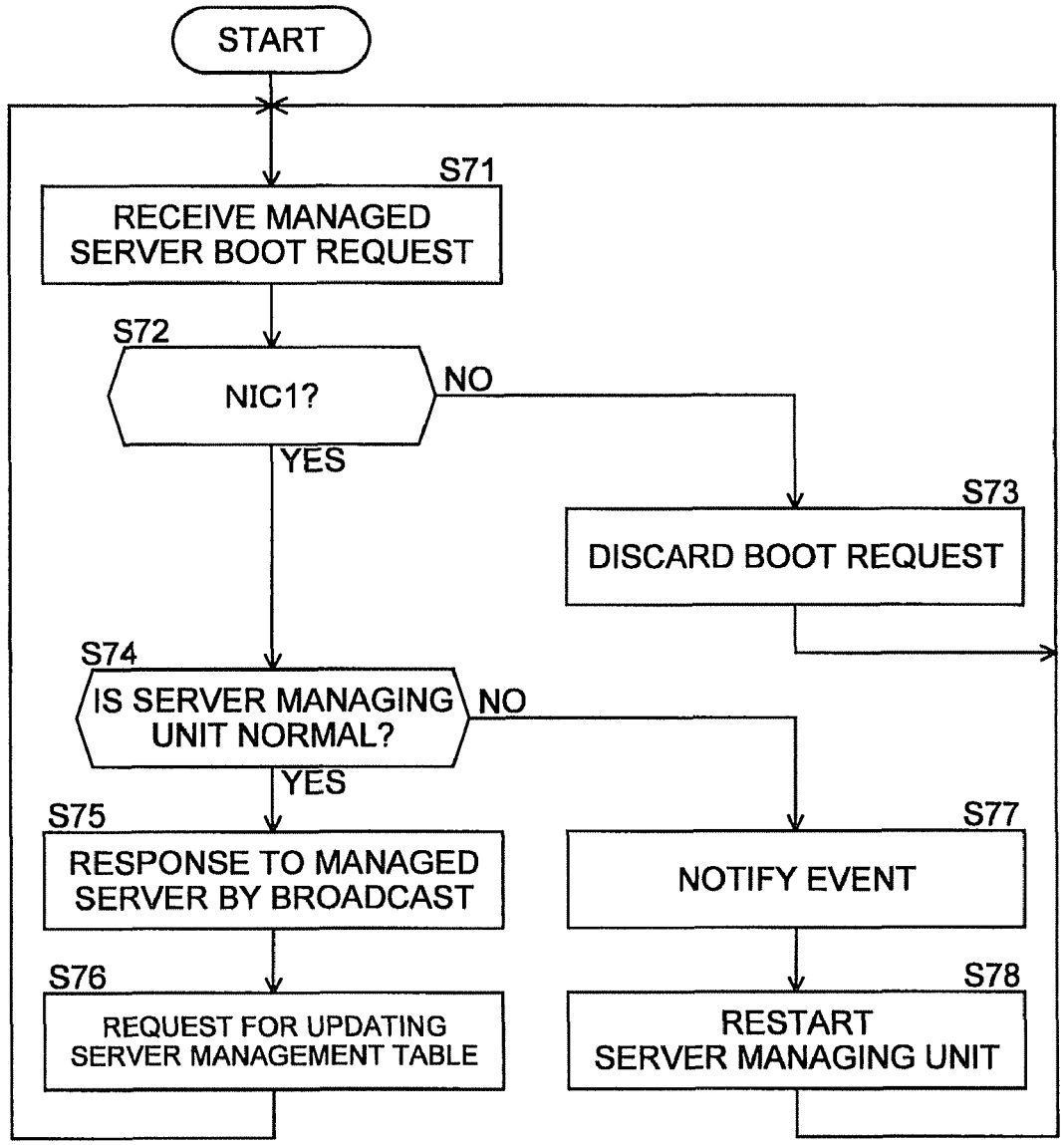
FIG. 17 illustrates a processing flow for a booting process executed by a primary boot controlling unit in the process of FIG. 16.

FIG. 17 illustrates a process flow of the booting process executed by the primary boot controlling unit 13 in the process of FIG. 16.

When the boot request from the managed server 4 (step S71) is received, the primary boot controlling unit 13 checks whether or not the received boot request is issued from the NIC 41-1 (step S72). When the received boot request is not issued from the NIC 41-1 (step S72, NO), the primary boot controlling unit 13 discards the received boot request (step S73), and then repeats the step S71.

When the received boot request is issued from the NIC 41-1 (step S72, YES), the primary boot controlling unit 13 sends the "alive query" to the server managing unit 12, and then checks whether or not the "alive" is received from the server managing unit 12 (step S74).

When the "alive" is received from the server managing unit 12, in other words, when the server managing unit 12 is operating normally (step S74, YES), the primary boot controlling unit 13 transmits the first boot response to the NIC 41-1 of the managed server 4 by broadcast (step S75). After that, the primary boot controlling unit 13 requests the server managing unit 12 to update the server management table 14 (step S76), and then repeats the step S71. Regarding the step S76, the update for the server management table 14 is a process for recording the receiving time of the boot request from the NIC 41-1 in the server management table 14, for example.

When the "alive" is not received from the server managing unit 12, in other words, when the server managing unit 12 is not operating normally (step S74, NO), the primary boot controlling unit 13 notifies the system administrator of an event, the occurrence of an error (step S77). After that, the primary boot controlling unit 13 tries to restart the server managing unit 12 up to a predetermined number of times (step S78), and then repeats the step S71.

Figure 18:
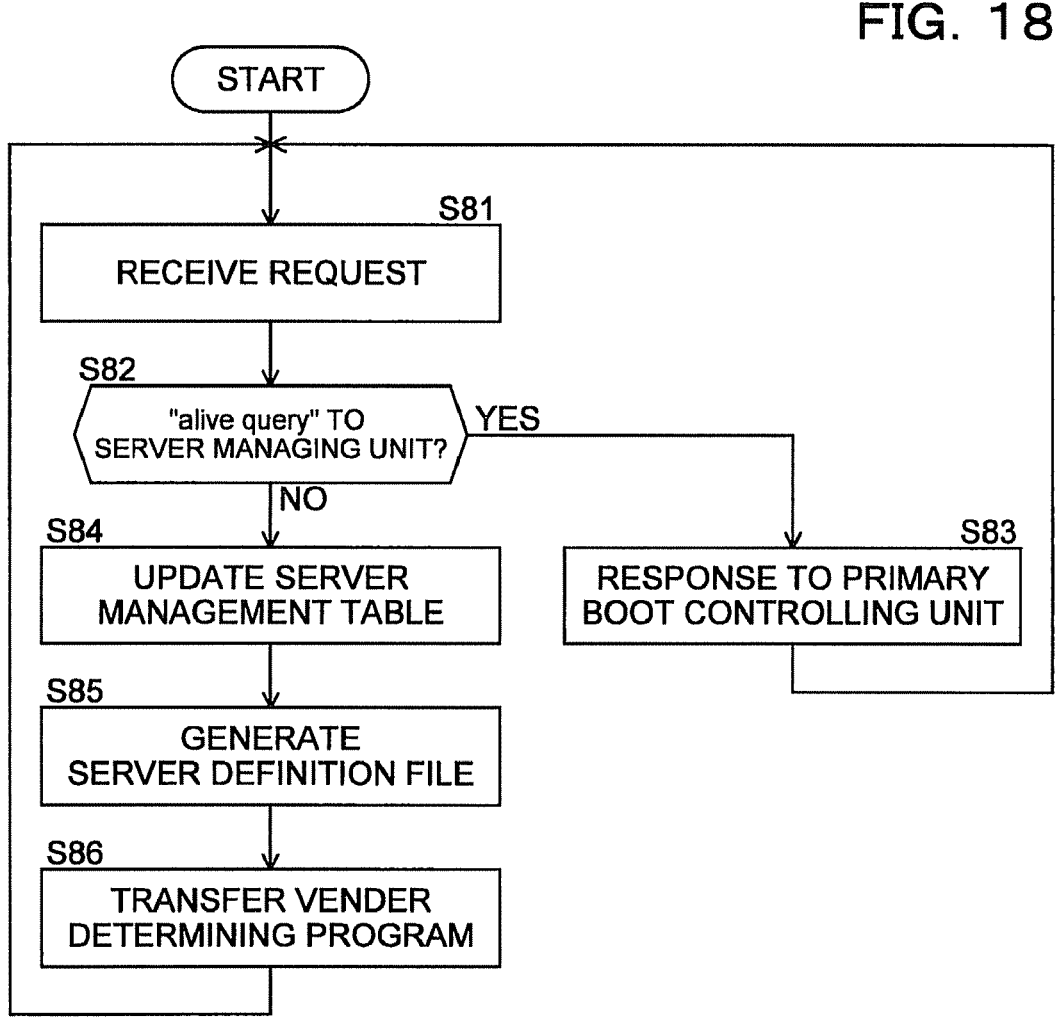
FIG. 18 illustrates a processing flow for a booting process executed by a server managing unit in the process of FIG. 16.

FIG. 18 illustrates a process flow of the booting process executed by the server managing unit 12 in the process of FIG. 16.

When a request from the primary boot controlling unit 13 (step S81) is received, the server managing unit 12 checks whether or not the received request is the "alive query" from the primary boot controlling unit 13 to the server managing unit 12 (step S82). When the received request is the "alive query" in the step S74 (step S82, YES), the server managing unit 12 sends back the "alive" as a response to the primary boot controlling unit 13 (step S83), and then repeats the step S81.

When the received request is not the "alive query", in other words, when the received request is a request for updating the server management table 14 in the step S76 (step S82, NO), the server managing unit 12 updates the server management table 14 (step S84), generates the server definition file 18 (step S85), transmits the received boot request to the HBA vender determining program 16 (step S86), and then repeats the step S71.

Figure 19:
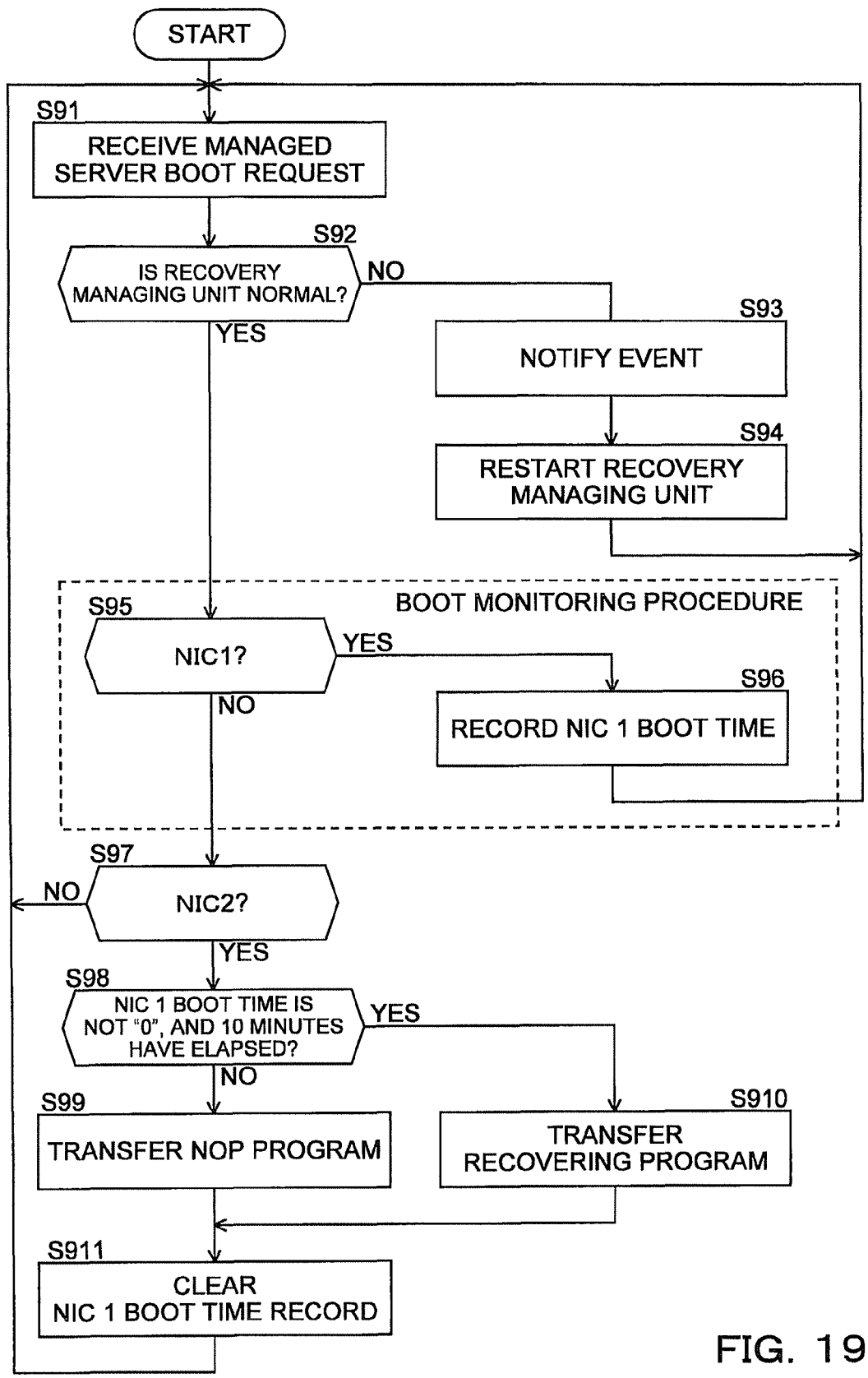
FIG. 19 illustrates a processing flow for a booting process executed by a secondary boot controlling unit in the process of FIG. 16.

FIG. 19 illustrates a process flow of the booting process executed by the secondary boot controlling unit 23 in the process of FIG. 16.

When the boot request from the managed server 4 (step S91) is received, and after sending the "alive query" to the recovery managing unit 22, the secondary boot controlling unit 23 checks whether or not the "alive" is received from the recovery managing unit 22 (step S92).

When the "alive" is not received from the recovery managing unit 22, in other words, when the recovery managing unit 22 is not operating normally (step S92, NO), the secondary boot controlling unit 23 notifies the system administrator of the event, the occurrence of an error (step S93). After that, the secondary boot controlling unit 23 tries to restart the recovery managing unit 22 up to a predetermined number of times (step S94), and then repeats the step S91.

When the "alive" from the recovery managing unit 22 is received, in other words, when the recovery managing unit 22 is operating normally (step S92, YES), the boot monitoring unit 24 executes steps S95 to S911 in a similar way to steps S44 and S410 of FIG. 13.

Figure 20:
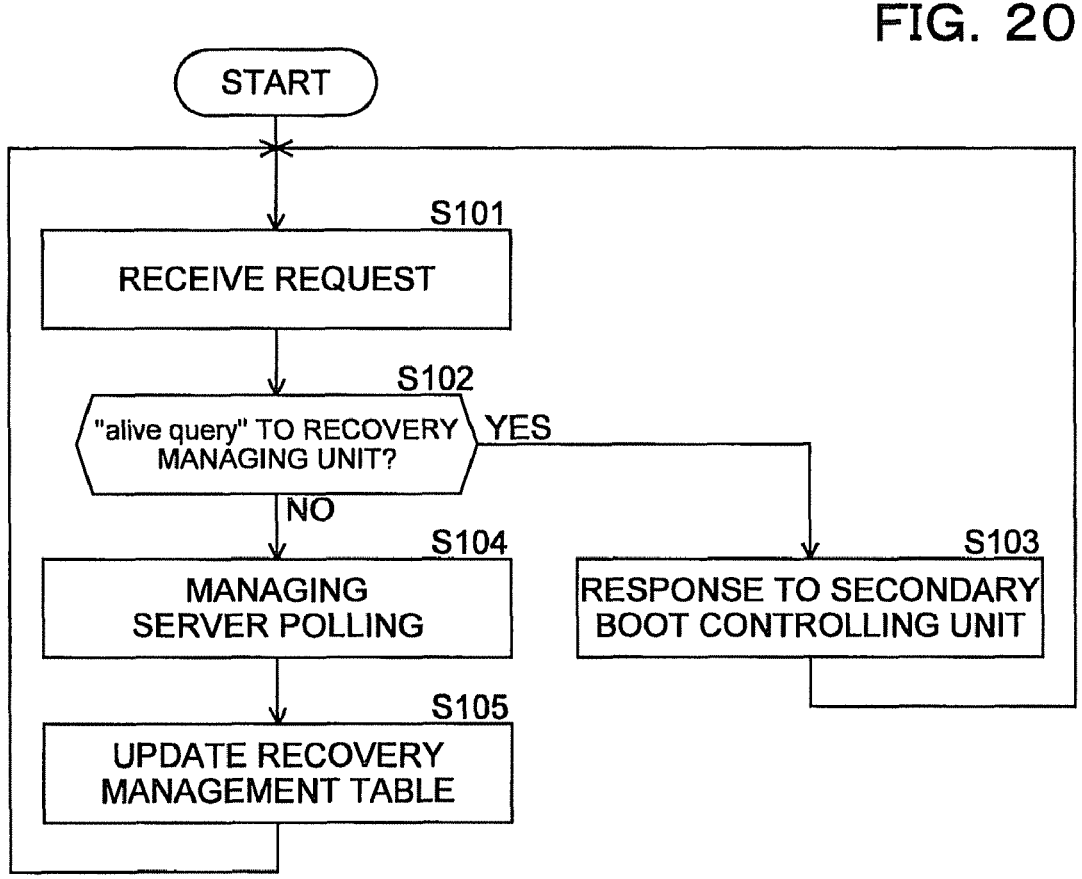
FIG. 20 illustrates a processing flow for a booting process executed by a recovery managing unit in the process of FIG. 16.

FIG. 20 illustrates a process flow of the booting process executed by the recovery managing unit 22 in the process of FIG. 16.

When a request from the secondary boot controlling unit 23 (step S101) is received, the recovery managing unit 22 checks whether or not the received request is the "alive query" from the secondary boot controlling unit 23 to the recovery managing unit 22 (step S102). When the received request is the "alive query" in the step S74 (step S102, YES), the recovery managing unit 22 sends back the "alive" as the response to the secondary boot controlling unit 23 (step S103), and then repeats the step S101.

When the received request is not the "alive query", the recovery managing unit 22 executes the polling for the server managing unit 12 of the management server 1 (step S104), updates the recovery management table 25 based on information received from the server managing unit 12 by such a polling (step S105), and then repeats the step S101. The steps S104 and S105 are recovery managing procedures executed by the recovery managing unit 22. Actually, in the steps S104 and S105, even when the request from the secondary boot controlling unit 23 is not received in the step S101, the step S101 is repeated in a predetermined time interval, and when the request from the secondary boot controlling unit 23 is received in such a time interval, the steps S101 to S103 are executed.

As disclosed above, the discussed computer system of an embodiment of the present invention is a computer system including a management server, a recovery server, a plurality of managed servers, and a management network connecting the management server, the recovery server, and the plurality of managed servers. The managed server comprises a boot priority order setting unit setting priority order in order of a first boot, a second boot, and a SAN boot, a first communicating unit transmitting a first boot request, a second communicating unit transmitting a second boot request, and a boot requesting unit issuing the first boot request from the first communicating unit, and issuing the second boot request from the second communicating unit. The management server comprises a boot processing program executing a booting process in the managed server, and a transmitting unit transmitting the boot processing program to the managed server when the managing server receives the first boot request from the managed server. The recovery server comprises a recovery management table storing an address of the first communicating unit transmitting the first boot request, and an address of the second communicating unit transmitting the second boot request, a monitoring unit monitoring a first boot response which is a response for the first boot request from the managing server, and a storing unit storing an NOP program not executing a recovering process, and a recovering program executing the recovering process. When the monitoring unit receives the first boot response from the managing server, the monitoring unit stores a receiving time in the recovery management table. When the monitoring unit receives the second boot response from the managed server and when a predetermined time has not elapsed from the receiving time stored in the recovery management table, the monitoring unit determines that the managing server is normal, and transmits the NOP program to the managed server, and when the predetermined time has elapsed, the monitoring unit determines that the managing server is stopped, and transmits the recovering program to the managed server.

Also, the recovery processing program of an embodiment of the present invention is a recovery processing program executed by the recovery server connected to the management server and a plurality of the managed servers through the management network. The recovery processing program causes the recovery server as a computer to execute storing, in a recovery management table, an address of a first communicating unit transmitting a first boot request, and an address of a second communicating unit transmitting a second boot request in the managed server in which priority order is set in order of a first boot, a second boot, and a SAN boot, monitoring a first boot response which is a response for the first boot request from the managing server, storing a receiving time in the recovery management table when the recovery server receives the first boot response from the management server, determining that the management server is normal, and transmitting an NOP program not executing a recovering process to the managed server when the recovery server receives the second boot response from the managed server, and when a predetermined time has not elapsed from the receiving time stored in the recovery management table, and determining that the managing server is stopped, and transmitting a recovering program executing the recovering process to the managed server when the recovery server receives the second boot response from the managed server, and when a predetermined time has elapsed from the receiving time.

According to the recovery server and the recovery processing program of the embodiments, based on the receiving time when a broadcast response (first boot response) of the management server for the boot request (first boot request) from the first communicating unit of the managed server is received, a determining process is executed for the condition of the managing server.

That is, when the boot request (the second boot request) is received from the second communicating unit of the managed server, and when the predetermined time has not elapsed from the receiving time, it is determined that the managing server is normal. This is because the boot request from the second communicating unit, which is to be executed next, is executed within a predetermined time from the first boot response for the boot request from the first communicating unit. In this case, the NOP program not executing the recovering process is transmitted to the managed server. Thereby, the boot request (for example, the boot from the SAN) to be executed next to the boot request from the second communicating unit can be executed.

On the other hand, when the predetermined time has elapsed from the receiving time, it is determined that the management server is stopped. This is because even when the predetermined time has elapsed from the first boot response for the boot request from the first communicating unit, the boot request from the second communicating unit, which is to be executed next, has not been executed. In this case, the recovering program executing the recovering process is transmitted to the managed server. Thereby, although the management server is stopped, the managed server can execute, by the recovering program, the boot request (for example, the boot from the SAN) to be executed next to the boot requests from the first and second communicating units.

As described above, for example, in the redundant computer system in the SAN environment, even when the management server is stopped because of hardware fault or software fault, the managed server can boot the program such as OS from the storage through the SAN.

According to this computer system, since the management network is replicated with the management server and the above recovery server, when the management server is normal, the managed server is caused to be able to boot up by the process executed by the management server, and when the management server is stopped, although the management server is stopped, as described above, the managed server can be caused to be able to boot up by the process executed by the recovery server.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A recovery server connected to a managing server and a plurality of managed servers through a management network, the recovery server comprising:
    a recovery management table storing an address of a first communicating unit, the first communicating unit transmitting a first boot request and an address of a second communicating unit transmitting a second boot request, the first boot request being a request for a first boot and the second boot request being for a second boot in a managed server in which a priority order is set in order of the first boot, the second boot, and a storage area network (SAN) boot;
    a monitoring unit monitoring a first boot response which is a response for the first boot request from the managing server; and
    a storing unit storing an NOP program which does not execute a recovering process, and a recovering program which executes the recovering process,
    wherein, when the monitoring unit receives the first boot response from the managing server, the monitoring unit stores a receiving time in the recovery management table, and
    wherein, when the monitoring unit receives the second boot request from the managed server and when a predetermined time has not elapsed from the receiving time stored in the recovery management table, the monitoring unit determines that the managing server is normal, and transmits the NOP program to the managed server, and when the predetermined time has elapsed, the monitoring unit determines that the managing server is stopped, and transmits the recovering program to the managed server.

2. The recovery server according to claim 1, wherein, the managed server which is a transmission destination of the recovering program obtains a new unique ID by decoding a value obtained by previously encoding a unique ID in a storage area network used by the managed server.

3. The recovery server according to claim 1, wherein, when the second boot request from the managed server is received, and before transmitting the NOP program or the recovering program, the monitoring unit determines whether or not the recovery server is normal, and when the recovery server is not normal, the monitoring unit outputs information indicating that the recovery server is not normal.

4. A non-transitory computer readable storage medium storing a recovery processing program to cause a computer to execute operations, the computer being a recovery server connected to a managing server and a plurality of managed servers through a management network, the operations comprising:
    storing, in a recovery management table, an address of a first communicating unit, the first communicating unit transmitting a first boot request and an address of a second communicating unit transmitting a second boot request, the first boot request being a request for a first boot and the second boot request being for a second boot in a managed server in which a priority order is set in order of the first boot, the second boot, and a SAN boot;
    monitoring a first boot response which is a response for the first boot request from the managing server;
    storing a receiving time in the recovery management table when the recovering server receives the first boot response from the managing server;
    determining that the managing server is normal, and transmitting an NOP program which does not execute a recovering process to the managed server when the recovering server receives the second boot request from the managed server, and when a predetermined time has not elapsed from the receiving time stored in the recovery management table; and
    determining that the managing server is stopped, and transmitting a recovering program which executes the recovering process to the managed server when the recovery server receives the second boot request from the managed server, and when a predetermined time has elapsed from the receiving time.

5. A computer system including a managing server, a recovery server, a plurality of managed servers, and a management network connecting the managing server, the recovery server, and the plurality of managed servers, the computer system comprising:
 a managed server including:
  a boot priority order setting unit setting a priority order in order of a first boot, a second boot, and a SAN boot;
  a first communicating unit transmitting a first boot request which is a request for the first boot;
  a second communicating unit transmitting a second boot request which is request for the second boot; and
  a boot requesting unit issuing the first boot request from the first communicating unit, and issuing the second boot request from the second communicating unit,
 a managing server including:
  a storing unit storing a boot processing program executing a booting process in the managed server; and
  a transmitting unit transmitting the boot processing program to the managed server when the managing server receives the first boot request from the managed server, and
 a recovery server including:
  a recovery management table storing an address of the first communicating unit transmitting the first boot request, and an address of the second communicating unit transmitting the second boot request;
  a monitoring unit monitoring a first boot response which is a response for the first boot request from the managing server; and
  a storing unit storing an NOP program which does not execute a recovering process, and a recovering program which executes the recovering process,
 wherein, when the monitoring unit receives the first boot response from the managing server, the monitoring unit stores a receiving time in the recovery management table, and
 wherein, when the monitoring unit receives the second boot request from the managed server and when a predetermined time has not elapsed from the receiving time stored in the recovery management table, the monitoring unit determines that the managing server is normal, and transmits the NOP program to the managed server, and when the predetermined time has elapsed, the monitoring unit determines that the managing server is stopped, and transmits the recovering program to the managed server.

6. The computer system according to claim 5, wherein, when the first boot request from the managed server is received, the transmitting unit transmits the first boot response, which is a response for the first boot request, to the management network.

7. The computer system according to claim 6, wherein, when the first boot request from the managed server is received, and before transmitting the first boot response, the transmitting unit determines whether or not the managing server is normal, and when the managing server is not normal, the transmitting unit outputs information indicating that the managing server is not normal.

8. The computer system according to claim 7, wherein the managing server includes a server managing unit managing a plurality of the managed servers, and when the first boot request from the managed server is received, and before transmitting the first boot response, the transmitting unit determines whether or not the server managing unit is normal, and when the server managing unit is not normal, the transmitting unit outputs information indicating that the server managing unit is not normal.

9. The computer system according to claim 8, wherein, when the server managing unit is not normal, the transmitting unit restarts the server managing unit.

10. The computer system according to claim 5, wherein, when the second boot request from the managed server is received, and before transmitting the NOP program or the recovering program, the monitoring unit determines whether or not the recovery server is normal, and when the recovery server is not normal, the monitoring unit outputs information indicating that the recovery server is not normal.

* * * * *